United States Patent [19]

Collins, Jr. et al.

[11] Patent Number: 4,739,520

[45] Date of Patent: Apr. 19, 1988

[54] OPTICAL SWITCHING SYSTEM

[75] Inventors: Stuart A. Collins, Jr., Worthington, Ohio; Bradley D. Clymer, Redondo Beach, Calif.

[73] Assignee: The Ohio State University, Columbus, Ohio

[21] Appl. No.: 532,161

[22] Filed: Sep. 14, 1983

[51] Int. Cl.$^4$ .............................................. H04B 9/00
[52] U.S. Cl. ............................... 455/600; 250/213 A; 350/96.14
[58] Field of Search ........... 455/600; 250/227, 213 A; 350/96.11, 96.13, 96.14, 96.15

[56] References Cited

U.S. PATENT DOCUMENTS

| | | | |
|---|---|---|---|
| 3,975,082 | 8/1976 | Winzer | 350/96.19 |
| 4,277,137 | 7/1981 | Upatnieks et al. | 350/162.13 |
| 4,385,799 | 5/1983 | Soref | 350/96.13 |
| 4,437,190 | 3/1984 | Rozenwaig et al. | 455/600 |

OTHER PUBLICATIONS

R. A. Becker and W. S. C. Chang, "Electrooptical Switching in Thin Film Waveguides for a Computer Communication Bus", Applied Optics, vol. 18, No. 19, Oct. 1, 1979.

R. Ian MacDonald and Elmer H. Hara, "Switching with Photodiodes", IEEE Journal of Quantum Electronics, vol. QE-16, No. 3, Mar. 1980.

P. Kermani and L. Kleinrock, "A Tradeoff Study of Switching Systems in Computer Communication Networks", IEEE Transactions on Computers, vol. C-29, No. 12, Dec. 1980.

*Primary Examiner*—Joseph A. Orsino, Jr.
*Assistant Examiner*—Leslie Van Beek
*Attorney, Agent, or Firm*—Emch, Schaffer, Schaub & Porcello Co.

[57] ABSTRACT

An optical switching system is disclosed comprising a set of optical hardware operating on control status supplied from electronic or electromechanical devices connected in a communication network to connect subscribing devices in the network for data transfer, wherein both control information for the system and the actual data information to be passed between two connected devices are coded in position coded light spots, and carried to the switching system by optical fibers.

20 Claims, 39 Drawing Sheets $L_1, L_3$ IMAGE IN x  $L_2$ FOURIER TRANSFORMS IN y
$L_4, L_6$ IMAGE IN y  $L_5$ FOURIER TRANSFORMS IN x

• DENOTES ORIGIN OF ARRAY

OPTICAL SWITCHING SYSTEM

BACKGROUND OF THE INVENTION

The growing popularity of parallel processing and the development of large networks of intercommunicating electrical and electromechanical devices have led to the search for a switching system that is capable of handling interconnections for a high density of data transfer between subscribers and that is able to ensure connection of all non-competing requests with minimum delay. The present invention provides a switching system which meets these demands. The background of this invention relates to the fields of optics and communication switching systems.

The field of optics has progressed considerably since the invention of lens systems that were designed for magnification and projection of light images. Optics today encompasses a wide range of equipment and operations, including a variety of lens and prism systems, analog optical processors, fiber optics and optical waveguides, and digital or numerical optical computers.

Imaging is vital to the operation of most modern optical systems. Of particular interest are relay-field lens systems, because these systems allow propagation of an image over a long path without divergence of the light beam, therefore conserving light.

The spatial Fourier transform capabilities of a lens is well known today. The development of optical detectors and light emitting diodes has led to widespread use of optical systems in Fourier transform configurations for analog computing with light. This procedure is especially useful in spectrum analysis and pattern recognition.

A great deal of research has been applied to the field of fiber optics and optical waveguides. Optical fibers allow fast communication with low attenuation over long distances, and optical waveguides are now being used in integrated optical systems to achieve switching between two optical communication lines by coupling techniques. Both of these devices allow a larger bandwidth for communication, in part, because of the optical carrier frequencies that are used.

Perhaps the newest and most exciting developments in optics have been in the area of digital optical computing. The development of real time image transducers, usually called spatial light modulators, has led to a major advancement in optical processing. In much the same manner as electronic processing, optical computing has progressed from analog systems to digital or numerical systems. Digital optical computers show promise of being much more versatile than analog systems, for the same reasons that digital electronic computers are more versatile than their analog predecessors. In addition, the spatial light modulators allow processing with arrays of independent image elements at one time through parallel processing.

Components of digital optical computers are developed as a result of use of spatial light modulators, which allow the intensity of light images projected onto one area of them to control light images projected through them or reflected off them, much in the same way transistors or diodes control output voltages as a function of input voltages. This characteristic of the spatial light modulator has enabled the fabrication of optical logic gates, flip-flops, and operational amplifiers. The advantage to such optical devices is the parallel nature of the two-dimensional input and output to them. Complete arrays of image elements are processed through arrays of logic gates at the same time, using the same lenses, polarizers, mirrors, and spatial light modulator.

Contemporary switching systems for connection of communication lines between intercommunicating electronic or electromechanical devices such as minicomputers or telephones interconnected in a network are generally one of two types. These systems are commonly known as store and forward systems or circuit switching systems. A third switching system, using optical waveguide principles, is known to be under development.

Store and forward systems involve moving data bursts through a switching lattice one node at a time while storing the message at each node along the path until a route to the next node is clear. These systems do not require a constant path from message source to message receiver, but allow the message burst to follow the first available path from node to node until the destination is reached.

Circuit switching systems provide a continuous path for two-way communication between two subscribers. Common types of circuit switching systems include electro-mechanical step-by-step and crossbar switching, and electronic switching.

Optical waveguide switching systems are in development stages and provide switching between two or more optical paths by controlled coupling techniques. These systems differ from the optical switching system of the present invention because the optical waveguide systems cannot operate on image arrays, but channel information along separate serially coded paths.

The present invention relates to a parallel processing optical switching system for intercommunicating electronic or electromechanical devices. This system does parallel processing by virtue of the imaging optics, which are used both for control and connection operations. The system operates with the incorporation of digital optical computing, and uses a spatial light modulator as a control device. The system uses all aspects of optics including imaging, Fourier transforming, and optical logic gates and flip-flops. The logic design has an obvious electronic analog. The switching network is of the circuit switching type.

The design requirements for the optical switching system of the present invention are a result of the characteristics of the network of intercommunicating electronic or electromechanical devices in which the system is intended to be used. These network characteristics include the network size and form of control information supplied to the switching system, user protocol that is assumed by the system, a model of the network, and a description of the type of communication transfer between subscribing devices.

The switching system of the present invention, assumes that the network comprises a star configuration with a plurality of subscribers. Addressing information for a connection request is not coded for the switching system, described herein, therefore a separate line for each possible destination address is supplied for each subscriber for initiating a request.

The switching operation of the present invention is designed for use of the following user protocol. A connection request is originated by activating the address lead of the desired destination subscriber. After a set time interval, the originating subscriber samples a status lead to determine if the request has been approved by the switching system. If the system has approved the request, the originating subscriber waits for a handshaking message on its data reception line from the destination subscriber. After communication is complete, the originating subscriber signals the switching system to disconnect by removing its connection request. The destination subscriber simply responds to a request interrupt supplied by the switching system by answering the origination subscriber with a handshake signal on its data transmission line.

The network of subscribers for which the optical switching system is designed is characterized as a star or hub with the electrical or electromechanical subscribers being modelled as satellites connected to a central unit. The subscribers are located in a circle around the switching system, and communication between different N subscribers is accomplished by establishing a line to the switching system from the subscriber requesting a connection and a line from the switching system to the subscriber that is being requested for communication. In this operation, the subscriber originating the call (originator) supplies the switching system with addressing information to connect a path to the requested subscriber (destination). The switching system responds by checking to see if the destination is not connected, and if so by allotting a path from the originator to the switching system and a path from the switching system to the destination.

The type of communication between subscribers in the network is characterized by the directions of message transfer and the type of messages being transferred. Two-way communication between subscribers involved in a connection is assumed for the network of the present invention. The switching system automatically allots a path for return communication from the call destination subscriber through the switching system to the call originating subscriber. The messages sent between the subscribers can range in length from short burst to long messages such as file transfer.

Switching systems are classified with respect to a number of different parameters. For instance, store and forward switching systems are inconvenient for both long messages and two-way communication transfer. Therefore, the circuit switching system is chosen for the optical application, that is providing constant communication paths between communicating subscriber pairs. In addition, the optical switching system is non-blocking in that every request for connection with an idle destination subscriber is completed. The system is not progressive in nature, because system control is parallel and the addressing of the destination for the request is immediately available to the system. The present invention is considered a direct control system, because a requested address for a destination subscriber designates the specific path that the data transfer takes through the switching system.

Although conventional circuit switching systems can be fast enough to handle certain communication connections, they are only capable of completing one connection at a time. In situations such as those with heavy traffic through the switching system, the call connections are either blocked by the system and refused or queued in some manner until the system can process the call. For telephony this is not normally a problem, because the switching speed is still fast enough to avoid any perceivable delay. For connections between computers in a network, however, delay time for heavy traffic periods is appreciable. For this reason, the optical switching system of the present invention has been developed. The parallel processing capabilities of the optical switching system will connect an arbitrary number of call requests and handle those call requests asyncronously and completely independently with respect to each other.

The optical switching system of the present invention is based on a crosspoint matrix. Although the system is based on a crosspoint matrix, the physical means of connection for the communication lines is quite different from the approach used in crossbar systems. The optical switching system employs matrix-vector multiplication techniques to connect the lines simultaneously and at the speed of light. In addition, the imaging optics allow the control circuitry to be parallel processing, providing more efficient use of control equipment.

The present invention comprises a switching system that is capable of processing communication connections between an arbitrary number of electronic or electromechanical subscribers in a network of N subscribers simultaneously and completely independently. The advantage of such a parallel processing switching system is the elimination of queing delay presented by serially operating switching systems. The added feature that the switching system is optical allows the communication between subscribers to be accomplished at much higher data rates.

SUMMARY OF THE INVENTION

The invention is an optical switching system for handling interconnections for a high density of data transfer between electronic or electromechanical subscribers connected together in a network. The optical switching system of this invention is a parallel processing system that uses imaging and Fourier optics for operation and control. The switching system is designed to service a network of N subscribers arranged in a star pattern, performing connections on data communication lines between them. The subscribers are connected to the switching system by fiber optic cables that enable information to be exchanged between them and the switching system for connection requests. In addition to these control and status lines, each subscriber is connected to the switching system with two communication lines for transmitting and receiving data with other subscribers.

The hardware for the optical switching system consists of arrays of optical logic components that are based on the light valve, including Boolean logic gates, threshold detectors, the master-slave flip-flops. Input areas to the optical components are partitioned on the active surface area of the light valve, with one square array being the crosspoint matrix for making the data line connections, and the other linear and square arrays being utilized for status approval for connection requests. The optics that are used to interconnect the components consists of mirrors, lenses, polarizers, and prisms.

The optical switching system of this invention is a circuit switching system that is non-blocking and non-progressive in nature. The system is directly controlled by the address information supplied by a call request originator. The non-blocking nature of the system insures that all non-competing calls are completed, while the non-progressive design allows for faster switching. The direct control of the system is characteristic of the prototype nature of the optical system, purposely done to simplify design of the system.

The spatial light modulator used for the switching device, has a reaction time of 100 milliseconds or less, however, it is known that spatial light modulators with switching speed of 10 microseconds are under development. Since the parallel processing capabilities of the imaging optical system allows for a large number of operations to be completed simultaneously, 10 microsecond optical devices will be comparable or faster than electronic switching devices, thereby enhancing high volume data manipulation.

The network interconnection and interaction of this invention includes N subscribers tied to all sides of the switching circuit, and provided that a subscriber does not request connection with itself, N/2 connection requests can be completed simultaneously due to the parallel processing nature to the optical circuit. To provide an idea the size of the network, the switching system of this invention is designed to accommodate N=80 subscribers, and could easily be expanded to handle 500 subscribers.

The interconnections between the subscribers and the switching circuit are optical fibers of the same length to ensure the provision of comparable intensity levels into the switching circuit. A cable of N+4 fibers from each subscriber provides N addressing lines, two status lines, and two communications lines for transmission and reception. The address lines provide an initial request and the address of destination when one subscriber requires communication with another subscriber. The first status line is activated by the switching circuit if the requested subscriber is free (not busy), providing information to the originating subscriber regarding the status of the destination subscriber. The second status line to a given subscriber is activated by the switching circuit if another originating subscriber requests that same subscriber as a destination. The last two lines are data lines for message transmission and reception, respectively.

The switching system of this invention is designed to operate with a network of electronic or electromechanical subscribers arranged in a star pattern and provides a two-way communication path between any two subscribers. The connection of subscribers is a parallel processing operation, and any request for connection is handled independently of other requests in the network.

The optical switching system designed uses one-third of the active surface area of a liquid crystal light valve to make connections between subscribers of a network of 80. Two more such systems could be operated on the same light valve, or the number of subscribers could easily be expanded to 500 by providing a separate light valve for each component area partitioned in this design.

The operation of the switching system is such that a connection of two subscribers is completed, including all busy status checks, with a time of four logic gate propagation delays. Disconnection is also achieved in four gate delays.

It is intended that the present invention relates a new optical switching system for use with a network of intercommunicating electronic or electromechanical devices. However, for the purposes of clarity in describing the preferred embodiment of the invention, the optical switching system will be described as its use is envisioned in a network comprised of a large number of minicomputers. Therefore, while the following drawings and description of the preferred embodiment relate the invention in terms of its use with minicomputers, this is not intended to be limiting of the scope of the present invention.

DETAILED DESCRIPTION OF THE PREFERRED EMBODIMENT

An optical switching system for use with computer networks having applications involving a high density of switching traffic is disclosed. The communication switching system of the present invention will first be represented mathmatically as a matrix-vector multiplier.

In a system of N subscribers, the network can be modeled by establishing two column vectors, A and B, the elements of one representing originators and the other representing destinations. The switching circuit is then modeled as an N×N squre matrix, Q, and the connections betwen originators and destinations are modeled as $$B = Q \times A$$

As an example of the model described above, consider a network of N=5 computers. To make a connection between originator and destination, the appropriate element of A is set equal of the appropriate element of B by actively controlling the values of the elements of Q. To demonstrate, connecting originator $a_1$ to destination $b_3$, $a_2$ to $b_4$, $a_3$ to $b_1$, $a_4$ to $b_5$, and $a_5$ to $b_2$ is accomplished by setting elements $q_{13}$, $q_{25}$, $q_{31}$, $q_{42}$ and $q_{54}=1$ and keeping the remaining elements of $Q=0$. This can be more easily seen in matrix form:

$$\begin{bmatrix} b_1 \\ b_2 \\ b_3 \\ b_4 \\ b_5 \end{bmatrix} = \begin{bmatrix} 0 & 0 & 1 & 0 & 0 \\ 0 & 0 & 0 & 0 & 1 \\ 1 & 0 & 0 & 0 & 0 \\ 0 & 1 & 0 & 0 & 0 \\ 0 & 0 & 0 & 1 & 0 \end{bmatrix} \times \begin{bmatrix} a_1 \\ a_2 \\ a_3 \\ a_4 \\ a_5 \end{bmatrix}$$

Clearly, $b_1=a_3$, $b_2=a_5$ $b_3=a_1$, $b_4=a_2$, and $b_5=a_4$. In general, the relationship for $$b_j = a_k$$

is accomplished by $$q_{jk} = 1$$

and $$q_{mk} = 0;$$

$$q_{jn} = 0$$

$$(m \neq j, n \neq k)$$

The optical approach to matrix-vector multiplication will be presented for discussion in two steps. The first step discloses a block diagram outline of the optical system. In this description, the Fourier transforms are viewed mathmatically, and an example is given for a five-by-five element matrix multiplied by a five element vector. The second phase of this discussion is a progression of the optical circuits used to manage the multiplication operation.

Figure 5:
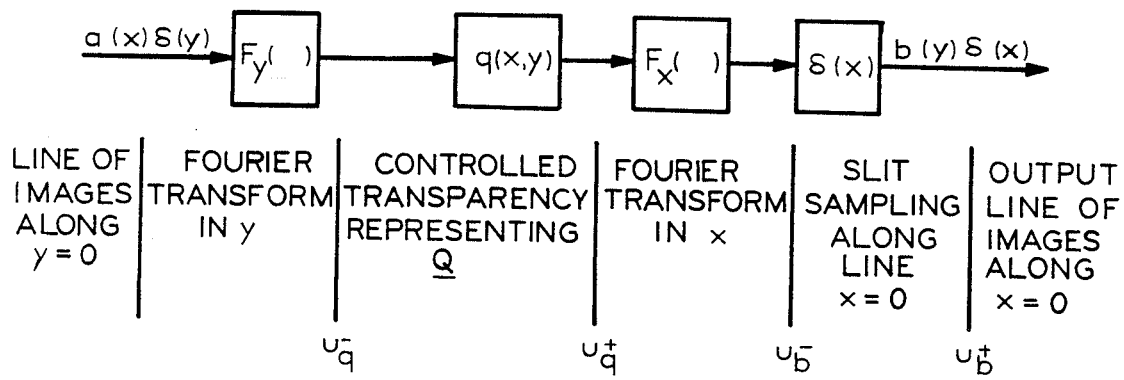
FIG. 5 is a block diagram showing optical matrix-vector multiplication.

Optical matrix multiplication is performed by taking advantage of the spatial Fourier transform characteristics of a lens. Referring now to FIG. 5, a block diagram of an optical matrix multiplier is shown. Basically, the procedure consists of providing an input vector of light spots arranged in a line and Fourier transforming the input images in the direction normal to the plane containing the image line and the direction of propagation. In the Fourier transform plane, a variable transparency modulates the intensity of the light from the input image transforms; then a second lens system Fourier transforms the transmitted light in a direction perpendicular to the original transform direction and that of the axis. In this system, the input spots represents the elements of A and the transparency represents the square matrix, Q. The output vector, B, is found by sampling the output Fourier transform plane through a slit on the axis perpendicular to the input image line.

In FIG. 5, a(x), a(x,y), and b(y) could be continuous functions, whereby a(x) and b(y) represent light intensities, and q(x,y) represents the intensity transmission of a variable transparency. Since discrete matrix-vector multiplication is more appropriate for communication switching, these continuous functions are modeled as discrete binary valued image points. To demonstrate the operation of this system, consider a vector, A, of five elements placed at points $x_1$ through $x_5$. For this case:

$$a(x) = a_1\delta(x-x_1) + a_2\delta(x-x_2) + a_3\delta(x-x_3) + a_4\delta(x-x_4) = a_5\delta(x-x_5)$$

where $a_1$, $a_2$, etc. are the digital intensities of the images at discrete points along the x axis. In a similar way, Q can be represented as:

$$q(x,y) = q_{11}\delta(y-y_1)\delta(x-x_1) + q_{12}\delta(y-y_1)\delta(x-x_2) + \ldots$$
$$q_{21}\delta(y-y_2)\delta(x-x_1) + q_{22}\delta(y-y_2)\delta(x-x_2) + \ldots$$

In actuality, the input to the y direction Fourier transform lens system is a line along the x axis, and is modeled as $a(x)\delta(y)$. In the Fourier transform plane, $U_q^-$, the superscript ($-$) implying a plane just before the Q transparency, the light images have been transformed in y but not x. Since $a(x)\delta(y)$ is only nonzero at $y=0$, then $$Fy[a(x)\delta(y)] = a(x)$$

Graphically this means that in the plane $U_q^-$, the input images are transformed into a set of lines parallel to the y axis with intensities corresponding to the intensities of the original input images.

The Q transparency blocks light in some areas and passes light in others according to the coefficients, $q_{mn}$ of the transparency matrix. Therefore, the intensity of the light in the plane, $U_q^+$, just beyond the transparency has the following form:

$$a(x)q(x,y) = a_1 q_{11}\delta(y-y_1)\delta(x-x_1) + a_2 q_{12}\delta(y-y_1)\delta(x-x_2) + \ldots$$
$$a_1 q_{21}\delta(y-y_2)\delta(x-x_1) + a_2 q_{22}\delta(y-y_2)\delta(x-x_2) + \ldots$$
$$a_1 q_{31}\delta(y-y_3)\delta(x-x_1) + \ldots$$

Fourier transforming in x gives the following intensities in the transform plane just before the output slit, $U_b^-$:

$$Fx[a(x)q(x,y)] = a_1 q_{11}\delta(y-y_1) + a_2 q_{12}\delta(y-y_1) + \ldots$$
$$a_1 q_{21}\delta(y-y_2) + a_2 q_{22}\delta(y-y_2) + \ldots$$

Combining terms in y gives $$Fx[a(x)q(x,y)] = (a_1 q_{11} + a_2 q_{12} + a_3 q_{13} + a_4 q_{14} + a_5 q_{15}) \cdot$$
$$(y-y_1) + (a_1 q_{21} + a_2 q_{22} + a_3 q_{23} + a_4 q_{24} + a_5 q_{25}) \cdot (y-y_2) +$$
$$(a_1 q_{31} + a_2 q_{32} + a_3 q_{33} + a_4 q_{34} + a_5 q_{35}) \cdot (y-y_3) +$$
$$(a_1 q_{41} + a_2 q_{42} + a_3 q_{43} + a_4 q_{44} + a_5 q_{45}) \cdot (y-y_4) +$$
$$(a_1 q_{51} + a_2 q_{52} + a_3 q_{53} + a_4 q_{54} + a_5 q_{55}) \cdot (y-y_5)$$

The slit along the y axis in the output Fourier transform plane has the effect of multiplying the above equation, which represents combination of the terms in y, by $\delta(x)$. If $b(y)\delta(x)$ represents the output vector, then:

$$b(y) = b_1\delta(y-y_1) + b_2\delta(y-y_2) + b_3\delta(y-y_3) + b_4\delta(y-y_4) + b_5\delta(y-y_5)$$

and:

$$b_1 = a_1 q_{11} + a_2 q_{12} + a_3 q_{13} + a_4 q_{14} + a_5 q_{15}$$
$$b_2 = a_1 q_{21} + a_2 q_{22} + a_3 q_{23} + a_4 q_{24} + a_5 q_{25}$$
$$b_3 = a_1 q_{31} + a_2 q_{32} + a_3 q_{33} + a_4 q_{34} + a_5 q_{35}$$
$$b_4 = a_1 q_{41} + a_2 q_{42} + a_3 q_{43} + a_4 q_{43} + a_5 q_{45}$$
$$b_5 = a_1 q_{51} + a_2 q_{52} + a_3 q_{53} + a_4 q_{54} + a_5 q_{55}$$

This is the form of a matrix multiplication where:

$$B = Q \times A$$

Since the number of elements in the example above was arbitrary, the example can be extended to any number of discrete elements. The maximum number of elements that are contained in the matrices is limited only by the size and resolution of the optical circuit employed.

The design of an optical matrix-vector multiplier can most easily be demonstrated as a progression of configurations with various degrees of complexity and usefulness. The first circuit to be discussed simply performs one-dimensional spatial Fourier transforms. The second circuit to be discussed is more conservative of light because it images the beam in the direction perpendicular to the Fourier transformation. The last circuit discussed is an adaptation of the second circuit, using only two lenses, and a controllable mirror instead of a transparency. This last circuit is most desirable for use in the optical switching system, because devices resembling controllable mirrors are relatively available.

Figure 6:
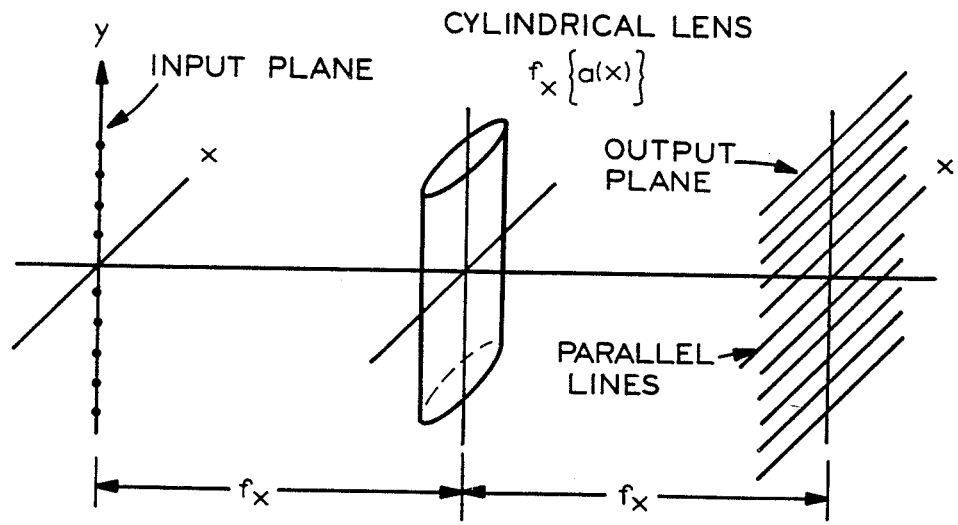
FIG. 6 is a schematic showing an optical Fourier transform in one direction.

The one-dimensional Fourier transforms represented in FIG. 5 can be performed by arranging cylindrical lenses such that the input Fourier transform lies in one focal plane and the output Fourier transform lies in the other focal plane as shown in FIG. 6. Referring to FIG. 6, the input image is Fourier transformed in the x direction, but not the y direction. To obtain a Fourier transform in the y direction, the cylindrical lens is rotated 90°. A basic optical matrix-vector multiplier could consist of two of these circuits cascaded and crossed so that the first performs a transform in the y direction, and the second in the x direction. However, this system has an undesirable characteristic in that diffraction causes crosstalk between image elements in the directions perpendicular to the Fourier transformation. Therefore, the system must be modified.

Figure 7:
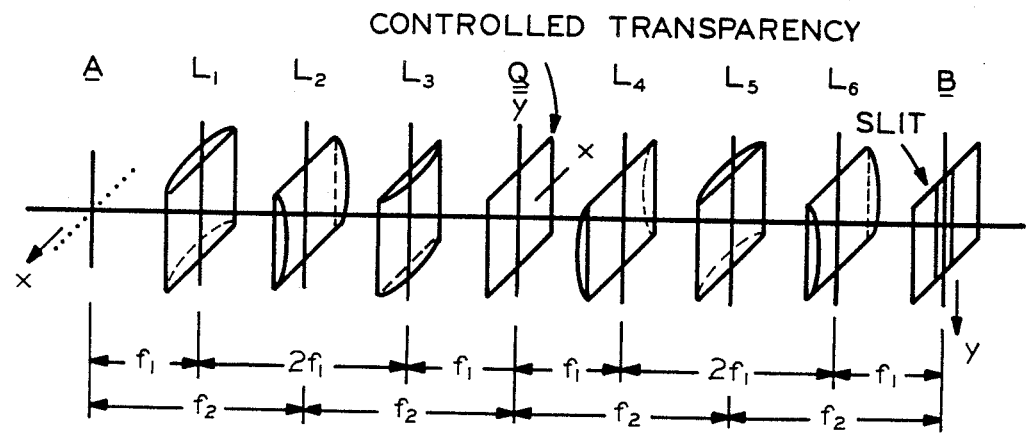
FIG. 7 is a schematic showing an optical matrix-vector multiplication scheme that conserves light by imaging in the directions perpendicular to the Fourier transformation.

A more useful lens system for matrix multiplication has been developed to image the input elements in one direction and Fourier transform them in the other direction. This system is shown in FIG. 7. The system of FIG. 7 uses an orthogonal cylindrical lens arrangement to achieve the crossed imaging and Fourier transform. The axes are reversed at image planes and transform as shown for the right half of the figure to give the Fourier transforms in x.

Figure 8:
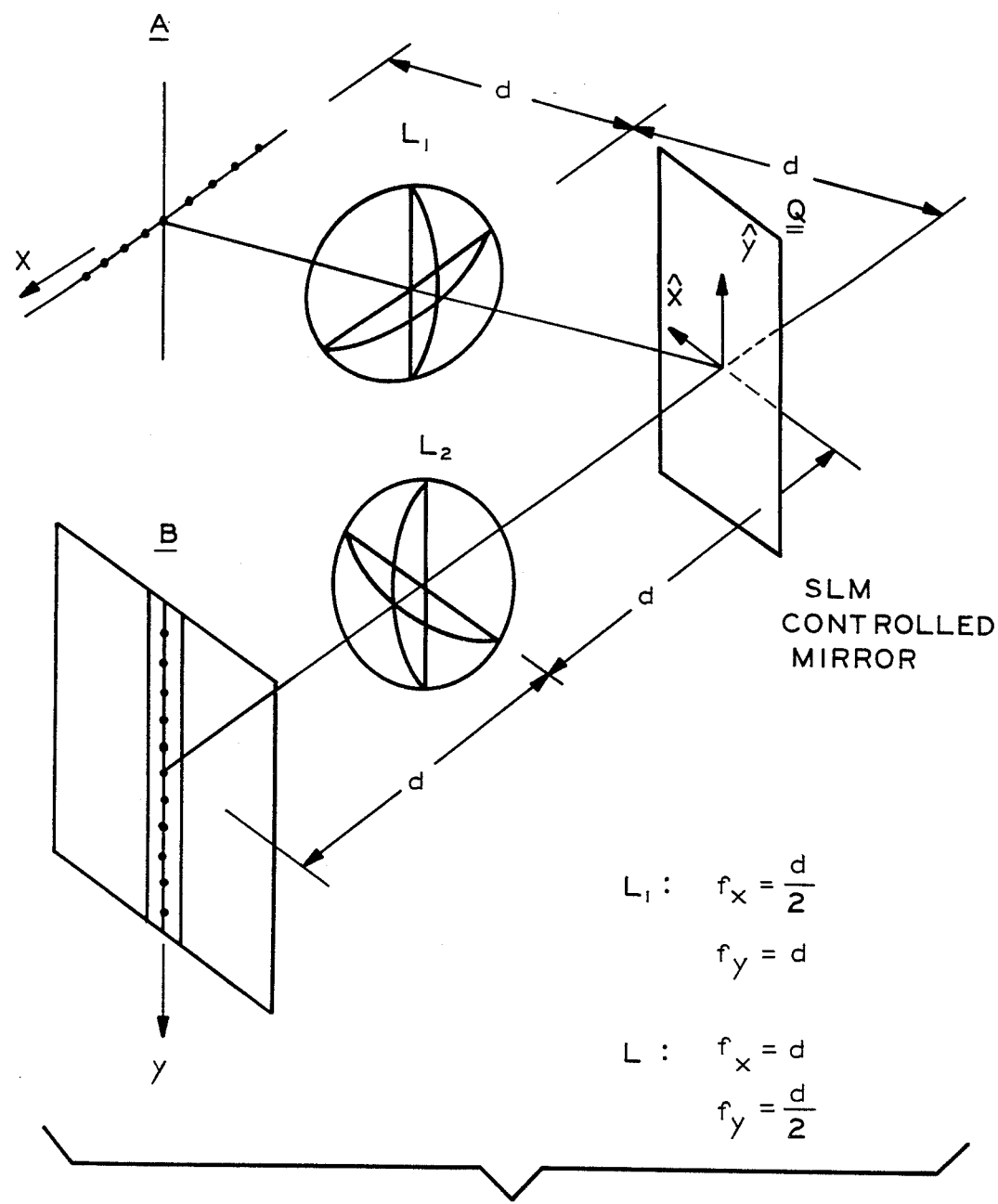
FIG. 8 is a schematic showing a two lens system for matrix-vector multiplication.

Another circuit that performs the similar imaging and Fourier transformation as the system of FIG. 7 is shown in FIG. 8. This circuit uses elliptical lenses to replace the lens system on each side of the transparency matrix in FIG. 7. Another modification in the system of FIG. 7 is the use of a controllable mirror at the crosspoint matrix Q. This controllable mirror is a spatial light modulator, or a real time active image transducer.

Figure 1:
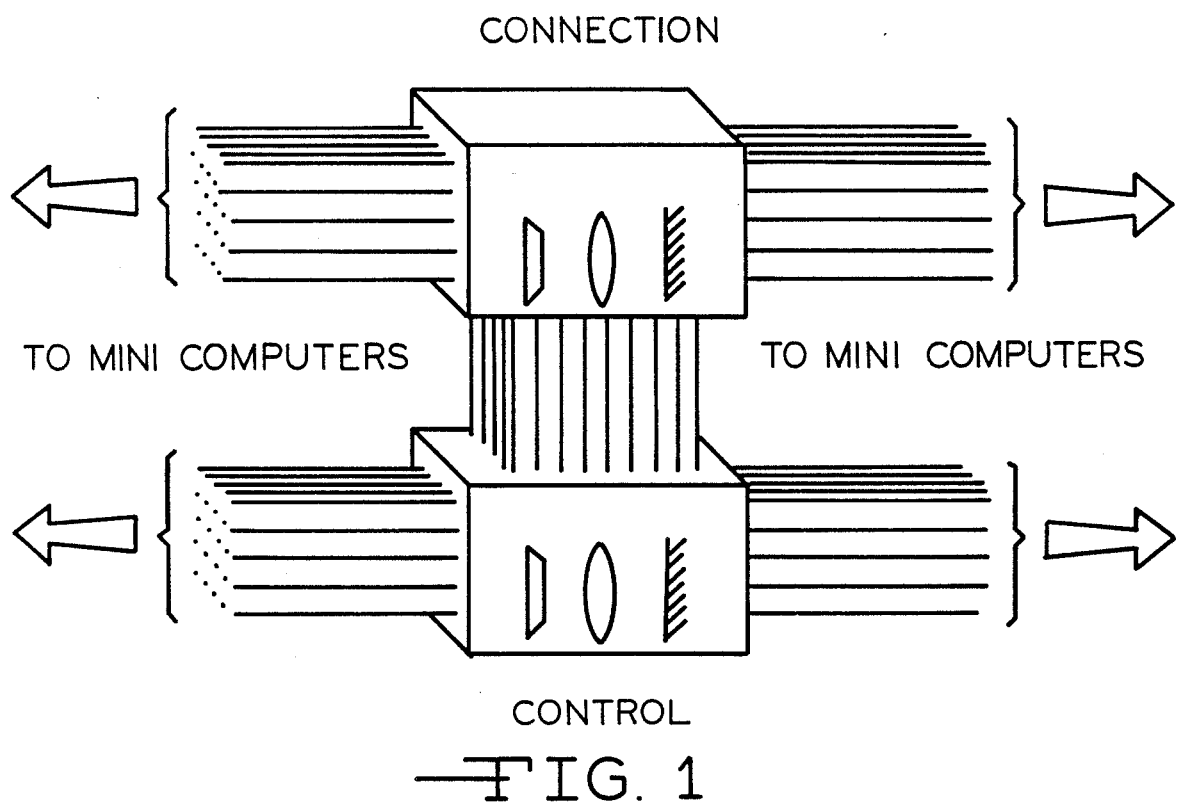
FIG. 1 is a schematic diagram generally depicting an optical switching system.
Figure 2:
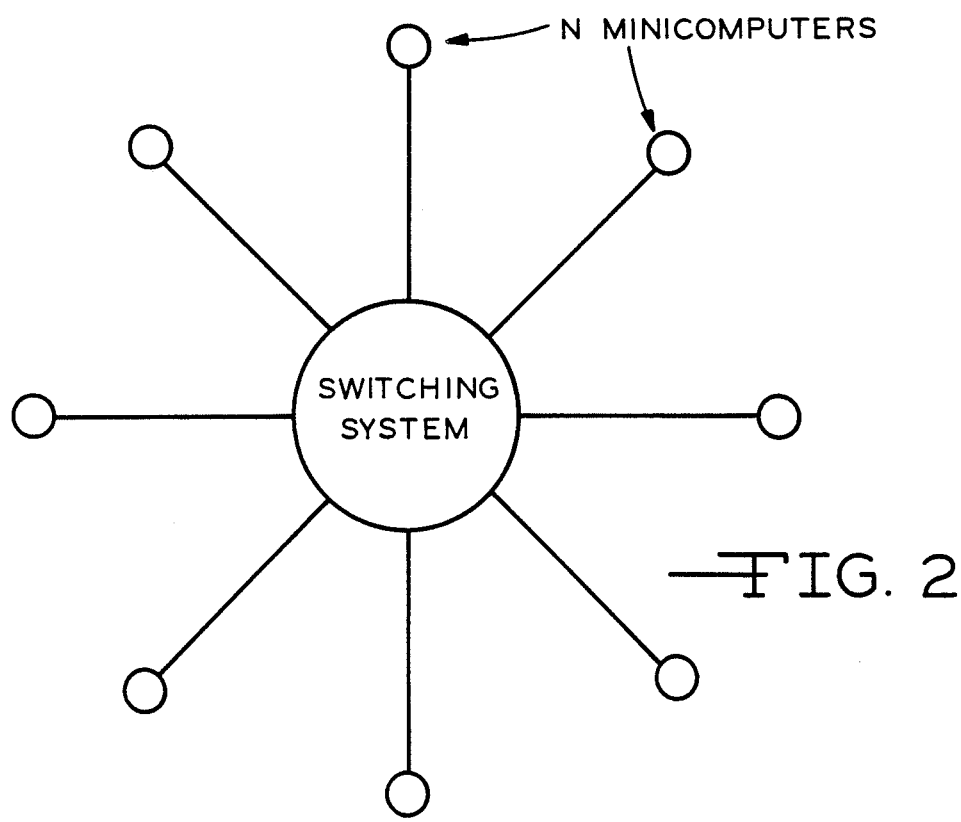
FIG. 2 is a schematic diagram of a star network of N minicomputers connected by an optical switching system.
Figure 3:
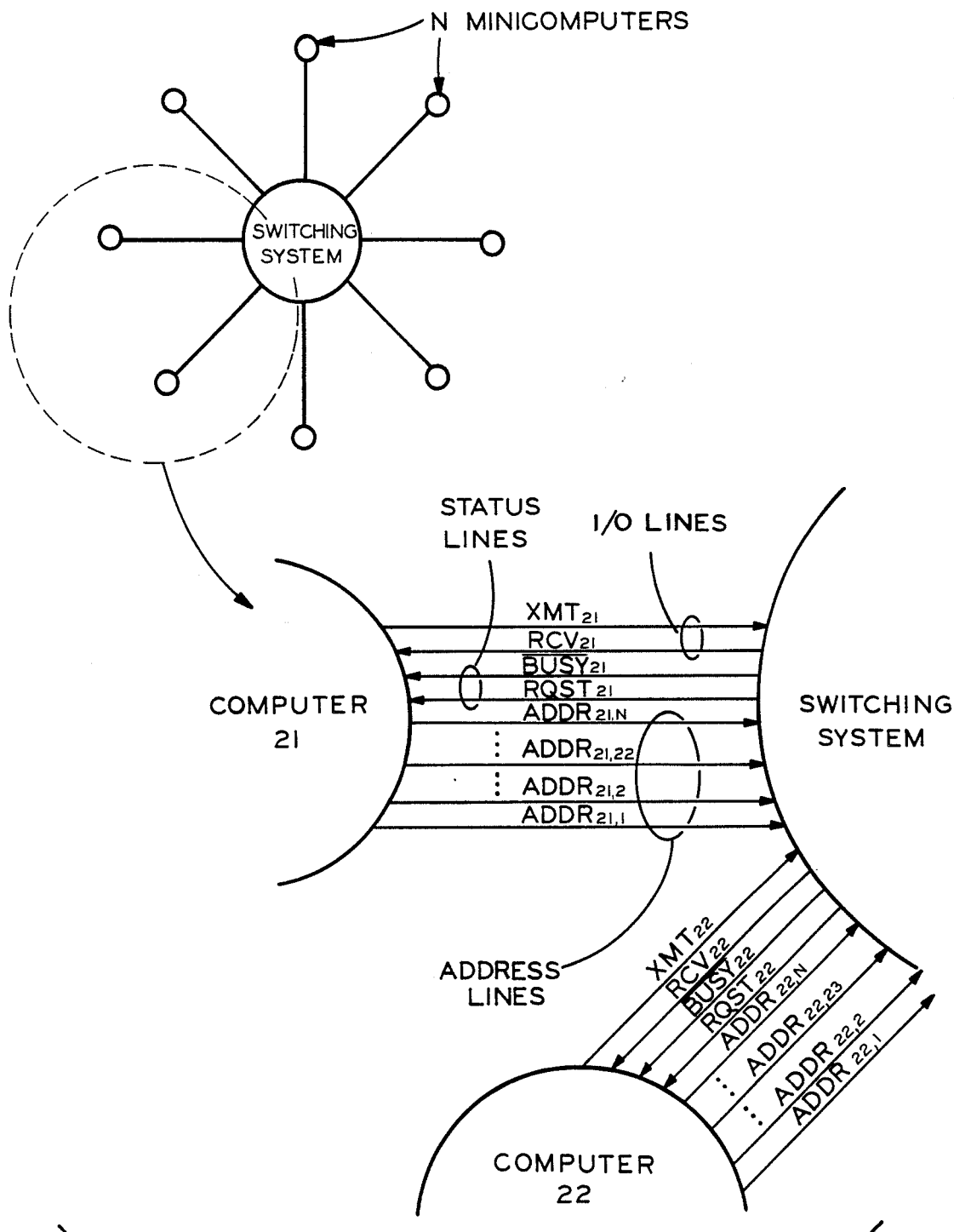
FIG. 3 is a schematic diagram showing the interconnections between two minicomputers in the optical switching system of the present invention.
Figure 4:
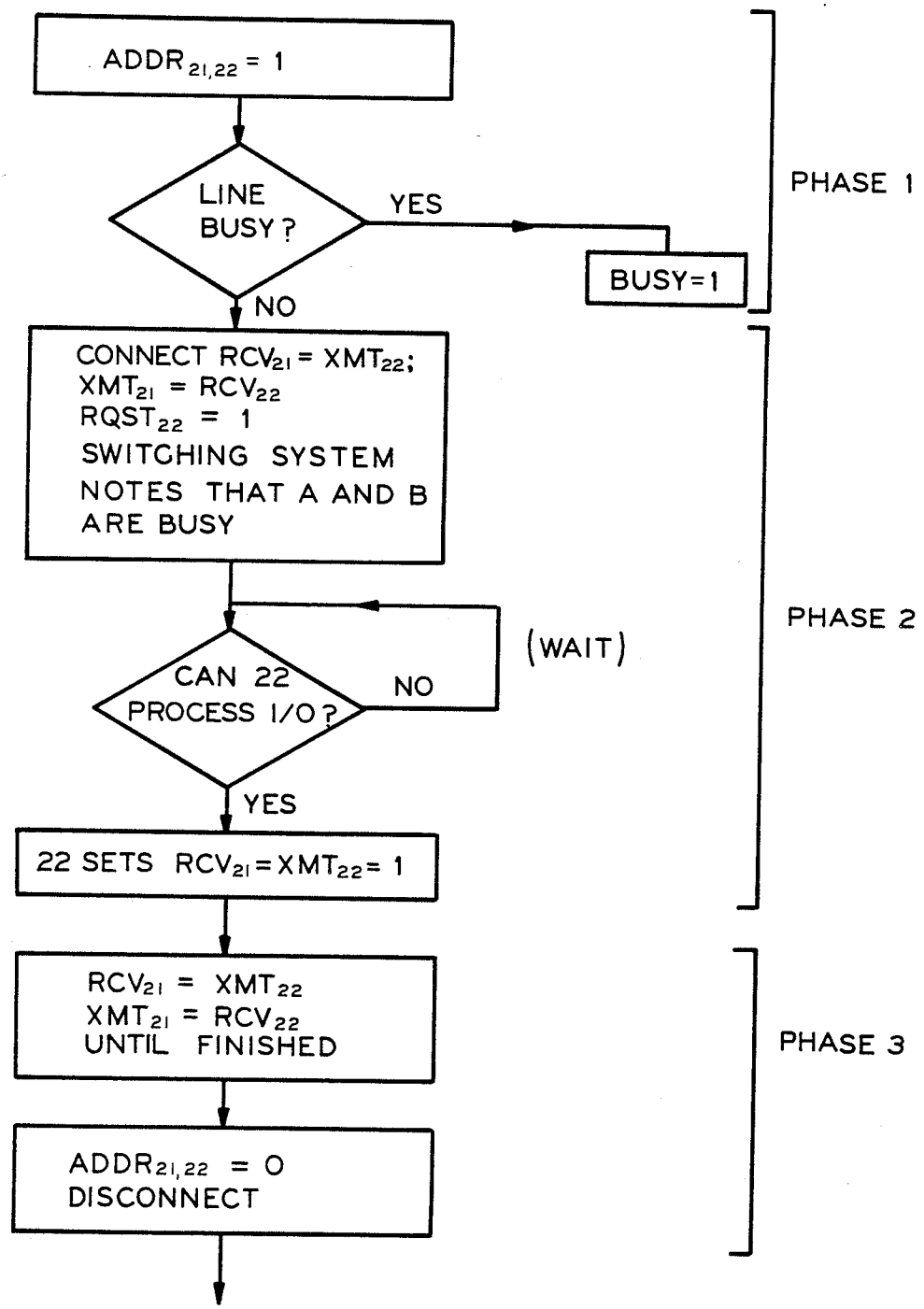
FIG. 4 is a flow diagram depicting a typical request for connection in the optical system of the present invention.
Figure 9:
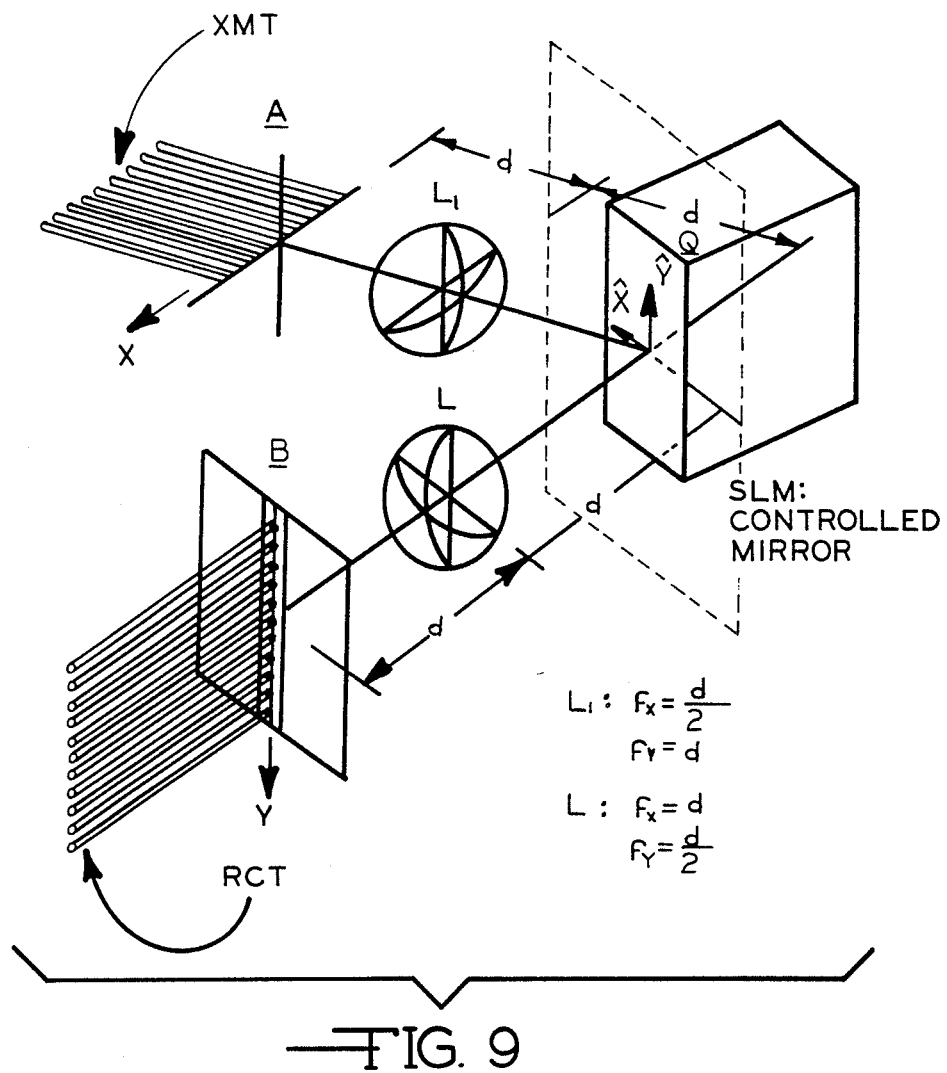
FIG. 9 is a schematic showing an optical matrix-vector multiplication for a switching circuit.

A more explicit diagram of the matrix-vector multiplication is shown in FIG. 9. FIG. 9 shows the input and output vectors as horizontal and vertical lines of optical fibers. The fibers are lined such that the light enitted from or focused onto the end is a row or column of image elements. The optical fibers are the transmitting communication line XMT and the receiving communication line RCV which are connected between the minicomputers, as shown in FIG. 3.

In the preferred embodiment the spatial light modulator (SLM) used to supply the crosspoint matrix, Q, and the optical logic necessary for controlling the crosspoint matrix is a Hughes liquid crystal light valve (LCLV). For the purposes of this discussion of the preferred embodiment, the LCLV is viewed as a device that responds to images projected onto a photosensitive (write) side of the light valve producing corresponding changes in polarization, which with an analyzer are translated into intensity changes.

Figure 10:
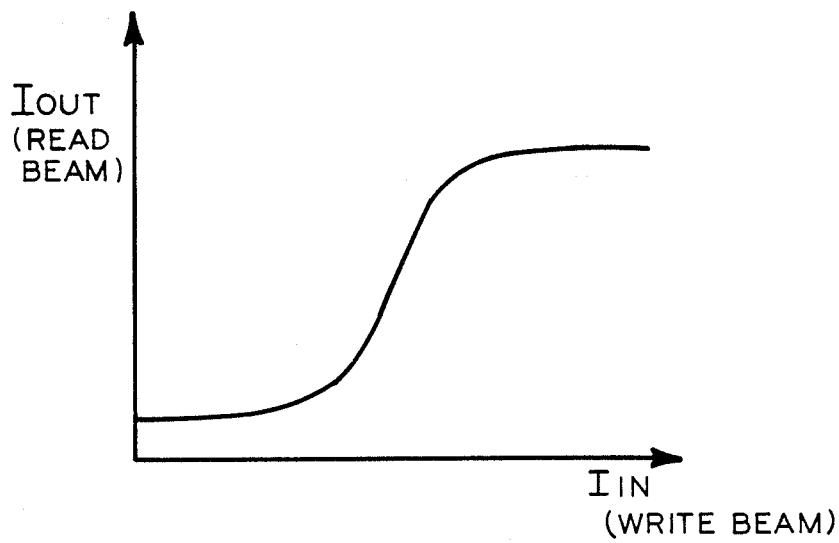
FIG. 10 is a graphical representation of a transmission curve for an LCLV with a crossed analyzer.

In operation, the coherent linearly polarized incident read beam is passed through the liquid crystal region, reflected off a dielectric mirror inside the LCLV, then passed back through the liquid crystal region and an analyzing polarizer of the LCLV designed to transmit only linearly polarized light of a desired orientation. In some situations, the analyzing polarizer is aligned parallel to the input read polarization; in others it is crossed 90° to the input polarization. A transmission curve for light passed through a crossed analyzer system is given in FIG. 10. FIG. 10 shows the intensity, $I_o$, of the light transmitted through the analyzer as a function of light incident to the write side of the LCLV, $I_i$. The transmission curve for the case when the analyzer is aligned parallel to the input polarization is the compliment of the transmission curve of FIG. 10. The zero input intensity to the write side for this orientation yields maximum transmission through the analyzer (i.e., $I_o$ is large when $I_i=0$), and decreases until $I_o=0$ when $I_i$ is large.

The transmission characteristics of the read beam through an analyzer show that the LCLV can be used as an optically controlled mirror. The curve applies independently at each image point, so the light valve is a spatially modulating mirror. This relationship allows the light valve to be used as a medium for creating binary optical functions such as switching and logic operations. The matrix of ones and zeroes for the communication switching system described earlier herein, are represented with bright image elements for ones and dark areas for zeroes. Boolean logic operations can also be performed with the light valve by using separate areas of the write side of the light valve as input arrays for operations and bouncing a read beam through the corresponding areas in succession. Different orientations of output and intermediate polarizer-analyzers allow all of the standard two input Boolean functions to be performed with optical imaging systems that employ a light valve. Such Boolean operations are an integral part of the control necessary to create the correct crosspoint matrix.

For the preferred embodiment of the optical switching system of this invention the independent asynchronous control of elements of the crosspoint matrix is achieved through digital optical techniques. The crosspoint matrix Q provides the data connection information for the matrix-vector multiplication method that is used by the switching system to connect communication lines between subscribing minicomputers in a network. The process of controlling the switching system basically consists of controlling the values of the elements of Q. Independent asynchronous control of each element of Q enables parallel control for the switching operation.

The digital optical components of the control system perform functions similar to digital electronic components. Electronic digital control typically is performed with components such as Boolean logic gates, analog to digital converters, and storage devices. The components used for control of the optical switching system of this invention include arrays of logic gates, an array of threshold detectors, and an array of flip-flops.

Figure 11:
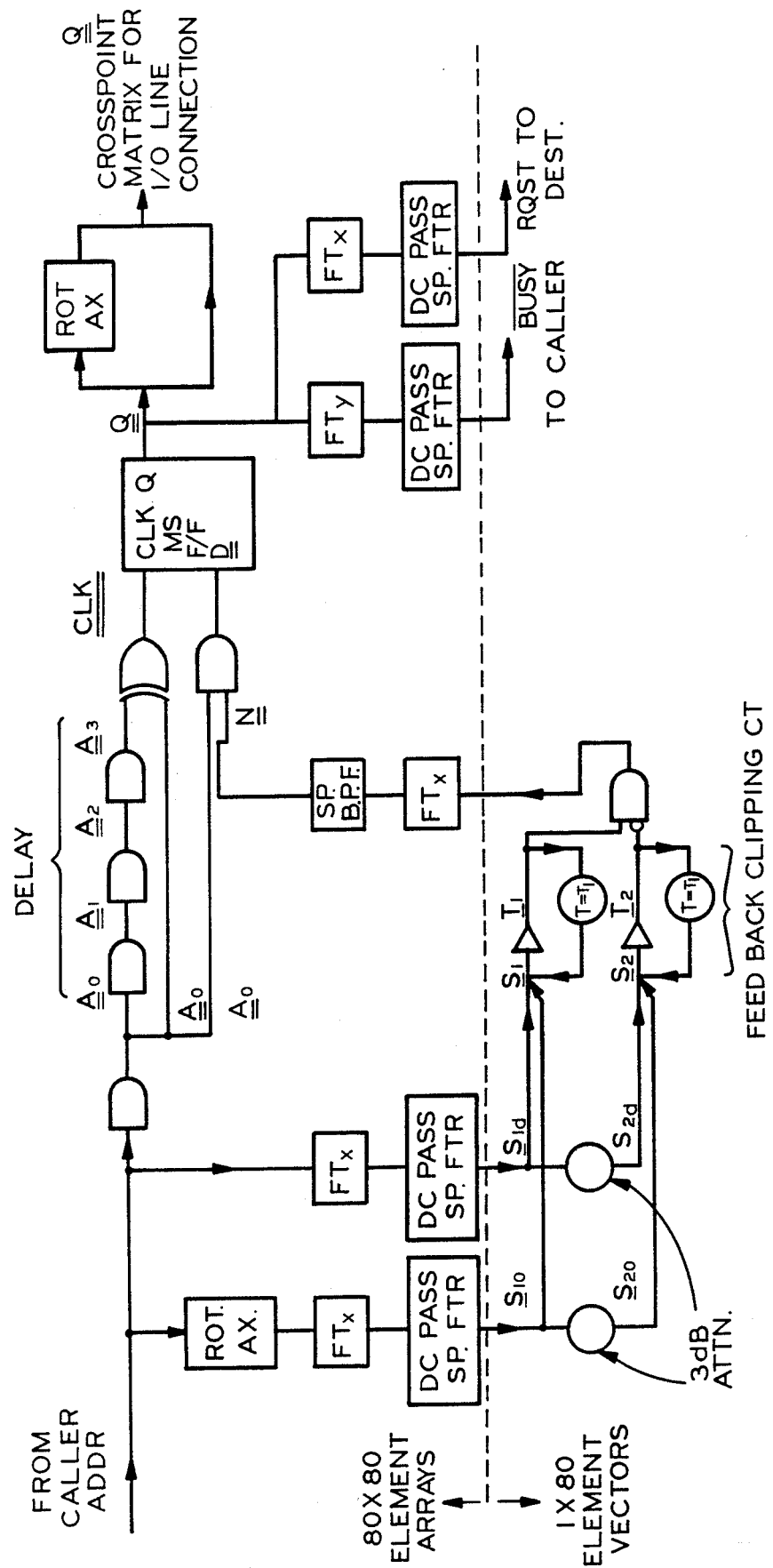
FIG. 11 is a control logic diagram for the optical switching system of this invention.

FIG. 11 shows a logic diagram for the control portion of the optical switching system.

FIG. 11 is composed of symbols resembling electronic digital gates. In actuality, each gate shown above the dotted line indicates an $N \times N$ array of similar gates with arrays of optical image elements as inputs and outputs to the gates. Each device shown below the dotted line represents a linear array of N devices operating on linear arrays of light image elements. Transition between the two regions in the diagram is accomplished by spatial Fourier transform filtering techniques.

All of the optical components used in this switching system use a spatial light modulator as a real time image transducer. For the purposes of this discussion, the spatial light modulator is viewed as an array of optical transistors that control output light as a function of input light intensity. The light valve AC voltage and input intensities are configured so that zero input intensity gives zero output, and a logic one in gives a logic one out.

Boolean logic functions are commonly used in electronic digital control circuits, therefore it is a straightforward procedure to use similar methods for digital optical control. The major advantage of optical logic control results from the ability to perform similar logic operations on independent elements of a two-dimensional image while using a single system of optical hardware to control the entire image. In this manner, optical control systems utilize parallel processing techniques.

Figure 12:
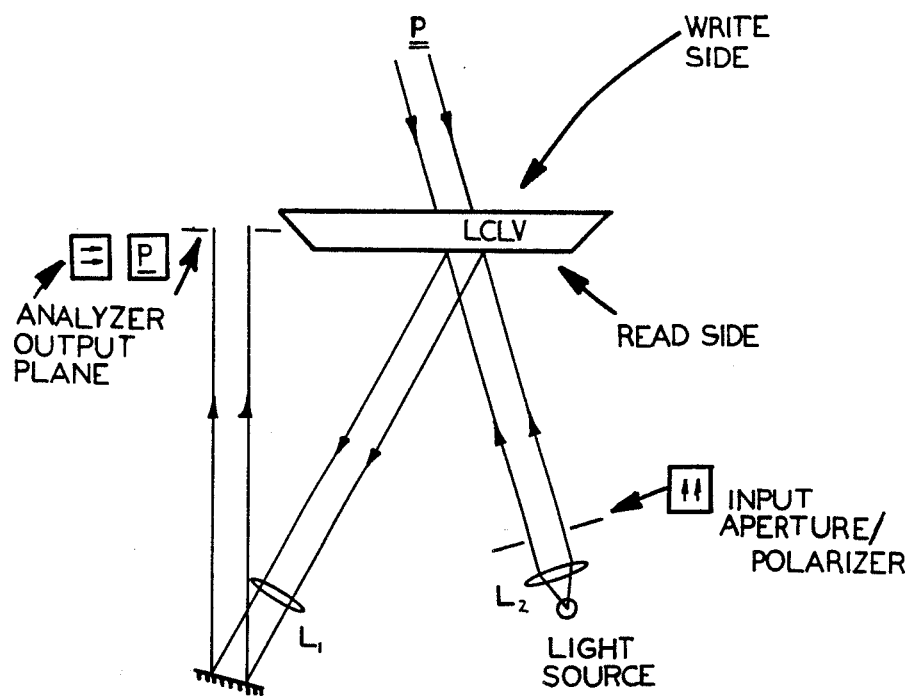
FIG. 12 is a schematic diagram of an array of optical delay gates.

The logic functions used for control of the optical switching system are one or two input functions. The delay gates that are shown in the top center of FIG. 11 are one input gates, and perform a degenerate Boolean function, $P=P$. Electronic delays such as RC circuits have no practical analog in digital optics, so the reaction delay of the spatial light modulator is used to create a delay for an array of images. An array of optical delay gates is shown in FIG. 12. This array of delay gates is realized by simply imaging the input array onto the photoconducting (write) side of the spatial light modulator and using a crossed polarization orientation for the output read beam.

Figure 13:
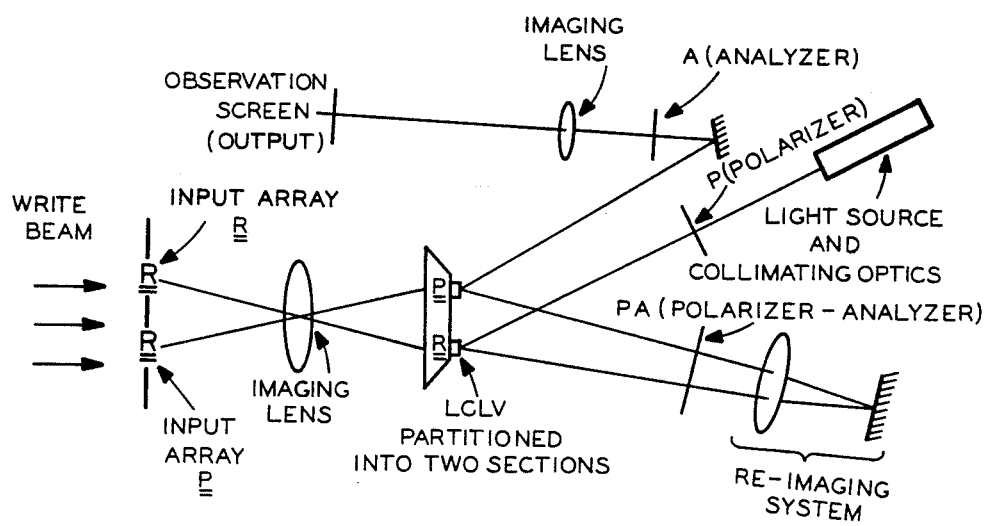
FIG. 13 is a schematic diagram showing a typical array of two input logic gates.

A typical two input array of logic gates is shown in FIG. 13. A beam is initially horizontally polarized and directed to a light valve with fast and slow axes at 45°. The beam is bounced twice off the read side of the light valve, passing through a polarized analyzer after each bounce. There are separate beams at the corresponding inputs on the write side. Different logic operations result from different polarizer and analyzer orientations. A standard AND operation is performed by using horizontally polarized light from the read beam source, an intermediate vertically polarized analyzer between bounces off the light valve, and a horizontally polarized output analyzer. The special AND operation shown in the bottom center of FIG. 11 is achieved by using vertical polarization incident on the R area of the light valve as shown in FIG. 13, then passing the beam through an intermediate horizontal polarizer before the reflection off the P area and through a horizontal output analyzer to perform P and R. The exclusive OR gate is achieved by using a vertical input polarization to the first bounce, no intermediate analyzer, and a horizontal output analyzer.

Figure 14:
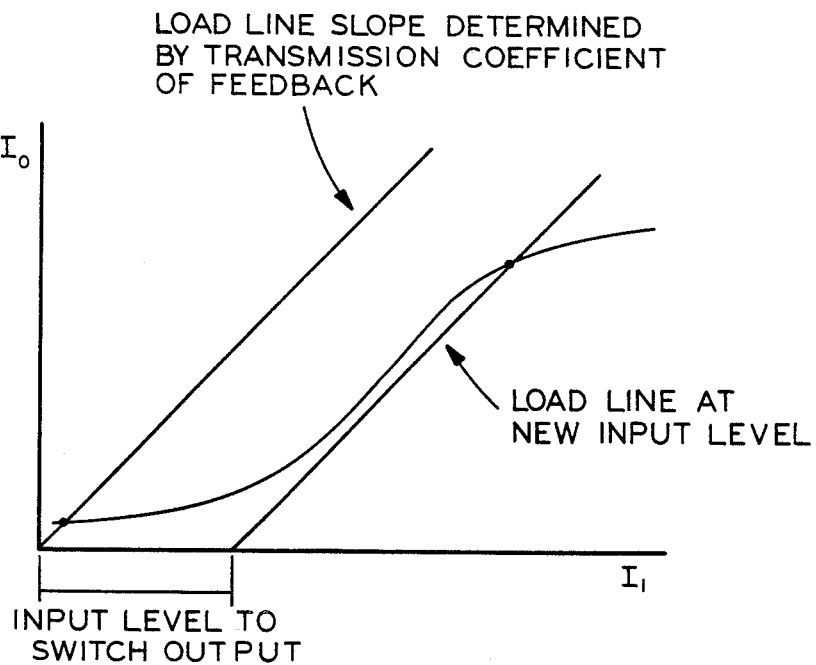
FIG. 14 is a graphical representation showing a characteristic curve for an optical OP-AMP with feedback.

Two linear arrays of threshold detectors are shown in the bottom center of FIG. 11. The function of these components is to provide separate output logic levels for input intensities below or above a threshold value. The optical threshold detector is similar to an operational amplifier with a feedback loop. The characteristic input-output intensity curve of the liquid crystal light valve is shown in FIG. 14. A feedback loop with a given attenuation constant forms a load line for the operation of the optical op-amp as shown in the figure. An external input to the threshold detector causes the load line to shift to the right as shown, moving the operating point of the amplifier with it. The slope of the load line is a function of the attenuation constant of the feedback loop, and this slope is set so that the load line is parallel to the maximum slope of the characteristic curve. This allows the maximum separation between different output levels for input intensities on opposite sides of the threshold.

Figure 15:
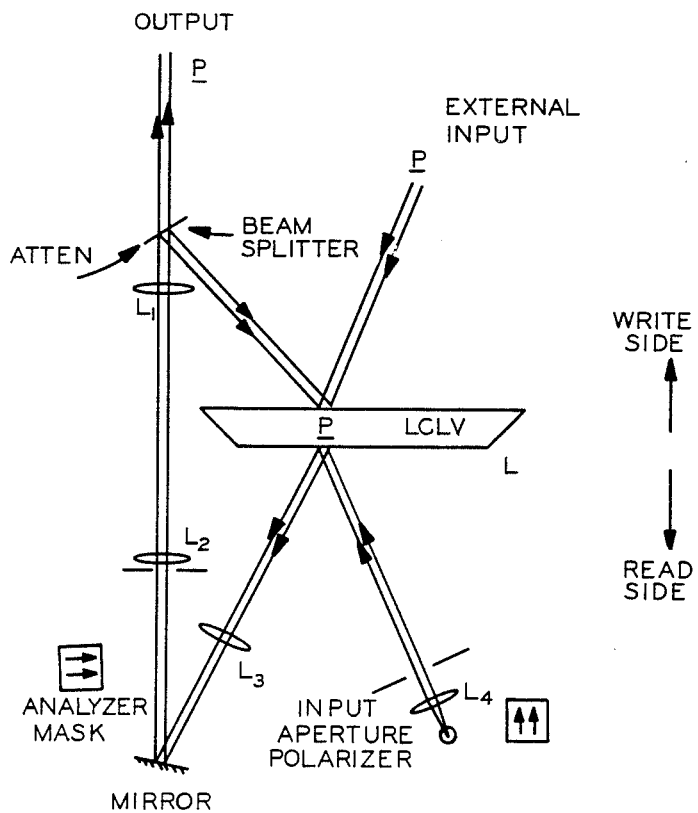
FIG. 15 is a schematic diagram showing a linear array of optical threshold detectors.

The optical layout for a typical linear array of threshold detectors is shown in FIG. 15. In this figure, the external input light beam passes through a semi-transparent mirror and is imaged onto the write surface of the light valve. The read beam is vertically polarized, reflected off the array area on the read surface of the LCLV, and passed through a horizontal output analyzer. This beam off the output side of the light valve is split into two parts. The first part is the output of the threshold detector, and the second is fedback to the write linear array input. The attenuation coefficient is handled automatically by the semi-transparent mirror.

A master-slave flip-flop (MS) is shown in the upper right of FIG. 11. This flip-flop array performs the traditional master-slave storing operation where data is fed into a master flip-flop to be stored while the clock input is a one, then the content of the master is transferred to a slave flip-flop after the clock changes from a one to a zero. The output of the slave is held until the cycle is repeated. The optical array of flip-flops have independent clocks and inputs for each image element in the array.

Figure 16:
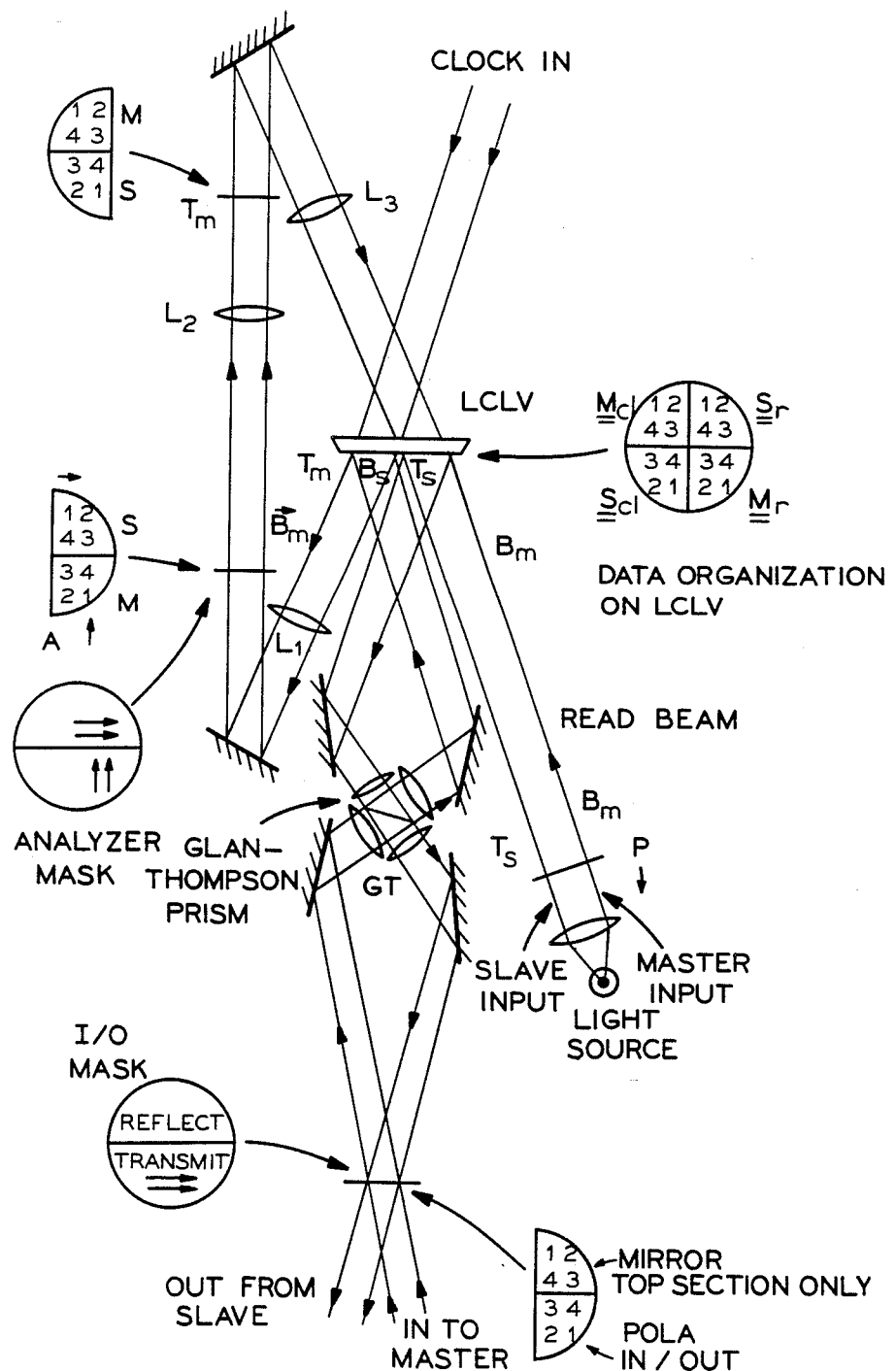
FIG. 16 is a schematic diagram showing an array of master-slave flip-flops.

An array of optical MS flip-flops is shown in FIG. 16. The light valve is shown with its area divided into four square arrays, as shown in the insert to the right of the light valve. The input to the read side comes from the polarized filtered source and illuminates the two right hand light valve areas. Light reflected off these areas passes to a Glan-Thompson polarizing prism where it may, depending on the polarization, be reflected back to the arrays on the left hand side of the light valve, or pass through the Glan-Thompson prism and be routed either around through it or out one-half of the mirror on the bottom of the figure. The mirrors and lenses around the Glan-Thompson prism form a cavity which images the left hand side of the light valve either onto the output plane at the bottom or onto the right hand side of the light valve. Light which bounces off the left hand arrays is fed back to the input side of the light valve, illuminating the right hand arrays. The clock beam illuminates the input to the left hand arrays. Both input and output beams to this array of flip-flops pass through a horizontal polarizer window at the angles shown. The four flip-flop array areas on the light valve are labeled $M_{cl}$ and $S_{cl}$ (master clock and slave clock), $M_r$ and $S_r$ (master and slave read). The optical layout consists of a mirror cavity that images the right hand half of the light valve read surface onto the plane of the input window shown at the bottom of the figure. The mirror above the input window is the output of the master flip-flop and the input to the slave flip-flop. A Glan-Thompson prism is used in the middle of the cavity to pass horizontally polarized light and reflect vertically polarized light. The operation of the flip-flop can be demonstrated by following an input image through the flip-flop to the output. The input array is imaged onto the input horizontal polarizer window at the bottom, and then is re-imaged by the cavity onto the $M_{cl}$ read area in the upper left quadrant of the light valve. The beam is reflected off the light valve and directed through a vertical analyzer on its way to the write area of $M_r$. For $M_{cl}$ elements corresponding to zeroes, the reflected elements are blocked by the vertically polarized analyzer because their polarization is unchanged by the light valve $M_{cl}$ input. The reflected elements off $M_{cl}$ corresponding to ones are passed by the analyzer, making the write intensity to $M_r$ one for elements that are inputs one and have corresponding clock intensities of one. This forms the input for the master section.

The write input to the $M_r$ area modulates a vertically polarized read beam incident on the other side of the LCLV. The $M_r$ beam is reflected off the LCLV, rotates polarization for elements of $M_r$ that are ones, and passes through the Glan-Thompson prism to be imaged onto the mirror above the input window. At this point, the array is the output of the master flip-flop and the input to the slave flip-flop. The beam is reflected off this mirror and imaged onto the slave clock area, $S_{cl}$.

The slave input image reflects off $S_{cl}$ to a horizontally polarized analyzer to be projected onto the $S_r$ area on the write side of the light valve. For $S_{cl}$ elements that are ones, the slave input elements are rotated in polarization from horizontal and do not pass the analyzer. The only elements passed by the analyzer for the slave beam are those that are unchanged in polarization, corresponding to zero clock inputs. This means that the output of the master is not transferred to the slave until the trailing edge of the clock pulse as noted earlier.

The beam incident on the $S_r$ write area modulates a vertically polarized read beam on the other side of the light valve. This $S_r$ beam is reflected off the read side to the Glan-Thompson prism. The prism passes the horizontally polarized light, corresponding to $S_r$ elements that are ones, and images these elements onto the input-/output window to exit the flip-flop. The vertically polarized elements are reflected by the Glan-Thompson prism.

Control of the optical switching system is achieved by controlling the values of elements in the crosspoint matrix that is used for the matrix-vector multiplication. The control that is used to manipulate the crosspoint matrix, Q, is accomplished with arrays of parallel processing components.

Figure 17:
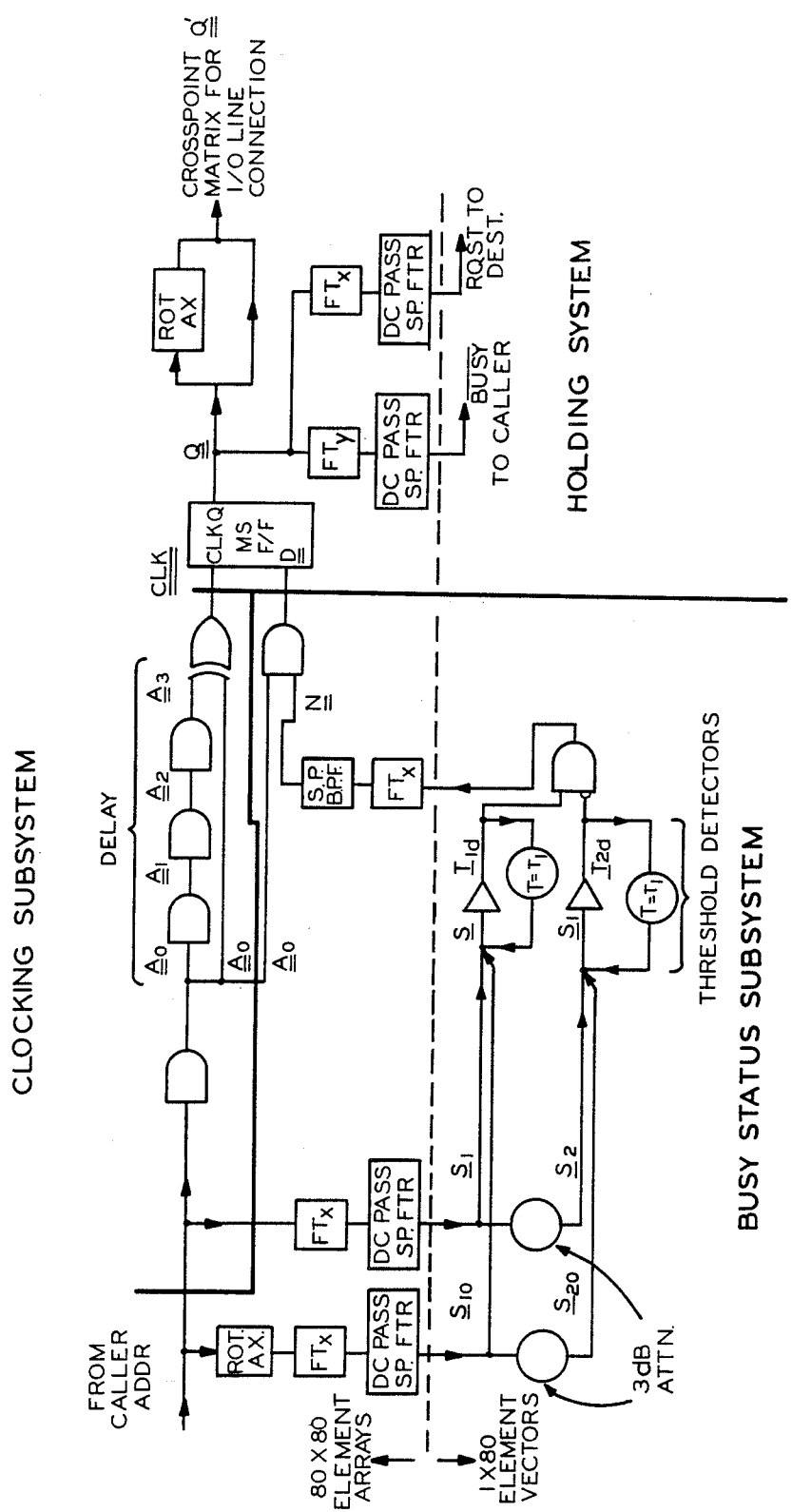
FIG. 17 is a control diagram for the optical switching system of the present invention.

The control of the optical switching system is comprised of the optical components described above. These components are interconnected as shown in FIG. 17 to enable desired changes in the crosspoint matrix that is used in the matrix-vector multiplication data routing operation. Referring to FIG. 17, the input addressing information for a connection request is shown in the top left, and the output of the control corresponds to the image array in the top right of the diagram.

The optical components of the control system are arrays of gates, threshold detectors, and master-slave flip-flops. Components that are shown above the dotted line represent square arrays of gates and flip-flops, and components shown below the dotted line are linear arrays of threshold detectors and logic gates.

The operation of the control system is divided into three parts, as shown in FIG. 17. The top center of the figure is a clocking subsystem, responsible for providing clock pulses for the master-slave flip-flop shown at the top to the right of center. The lower half of the drawing is a busy status check, and the left top of the figure is a holding subsystem that maintains the crosspoint matrix. The input is a matrix array at the upper left square of the holding subsystem. There are three outputs from the control system. The largest one is the Q' matrix shown in the upper right which goes directly to the light valve to set the crosspoint matrix. The other two are one dimensional arrays which fan out to all the computers to provide BUSY and RQST signals.

The purpose of the clock subsystem is to provide two clock pulses for the holding subsystem: one for connection set-up and the second for disconnection. The clocking subsystem consists of four delay gate arrays and an exclusive-OR gate array.

Figure 18:
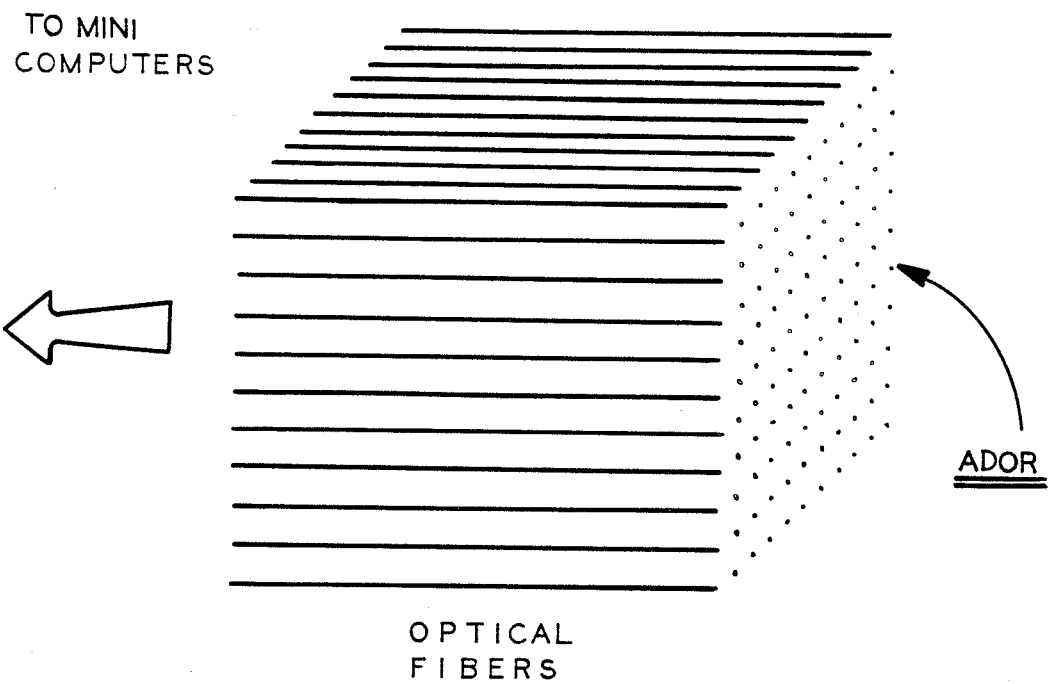
FIG. 18 is a schematic diagram showing an address cable configuration for input to a clocking subsystem.

The input array to the clocking subsystem is the ADDR image from the optical fiber cables connected to the minicomputers, as shown in FIG. 3. The ADDR cable from each computer is lined vertically with the cables from the other minicomputers, as shown in FIG. 18, to create a square array as shown. Information regarding any connection request information between minicomputers is position coded in the square ADDR array. Each connection request is a spot of light from the end of the particular addressing fiber used. The vertical position of a spot specifies the destination address for a request and the horizontal displacement of a spot identifies the request originator. This configuration is consistent with the position of non-zero elements in the crosspoint matrix for the matrix-vector multiplication. In the preferred embodiment these ADDR inputs are for control only and carry no data information.

Figure 19:
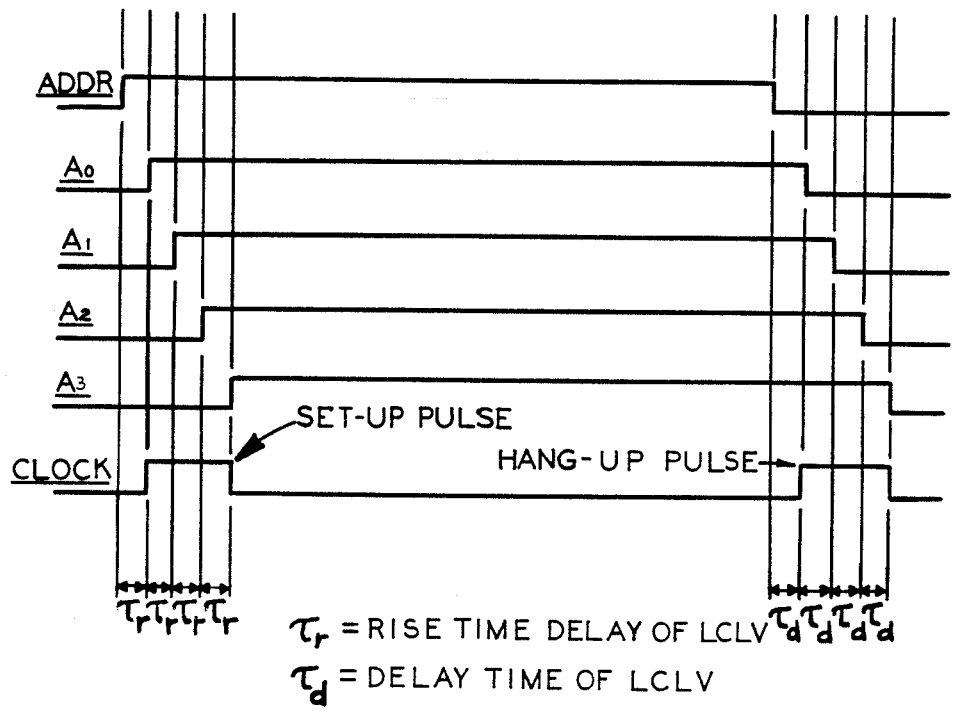
FIG. 19 shows a timing diagram for a clocking subsystem.

The timing of the clocking subsystem is demonstrated in the diagram given in FIG. 19. This figure shows, as a function of time, the intensity level of an image element for a request in each of the logic gate arrays in the clocking subsystem of FIG. 17. The step input from ADDR fibers is shown as well as the output of delay gates $A_0$, $A_1$, $A_2$, and $A_3$. The output of $A_0$ is split off and exclusive-OR'ed with the output of $A_3$ to form the master-slave clock pulse, as shown in FIG. 19. Two clock pulses are formed, one at the beginning of the request for connection (set-up), and the second at the end of data transfer (disconnect). The vertical lines in the diagram depict the reaction times of the light valve. The wave forms are shown as rectangular pulses in FIG. 19, but in reality exhibit exponential rise and decay times.

A communication switching system must be able to identify subscribers that are already in communication through in the network so that outside connection requests do not disrupt this communication. This procedure is a status check of the destination of a connection request. A request to a destination that is already in communication is not completed in order to maintain the existing communication.

The BUSY status check for the optical switching system consists of a threshold detection and a level slice operation. These operations are shown in FIG. 17 on the left hand side along the bottom. The threshold detection is achieved by the feedback amplifier of FIGS. 14 and 15. The level slicing operation is performed by an AND gate that has one positive true logic input and one negative true logic input. The first step in checking busy status is to perform a spatial Fourier transformation of the ADDR input matrix in the x direction while imaging the array in the y direction, combined with passing the light through a vertical slit to pass only the spatial zero frequency in the x direction. This gives a vertical array of possible positions with elements illuminated corresponding to the originator or destinator computers for a connection request. The vertical array of possible elements is applied to the gates at the bottom of FIG. 17.

Since the light image of ADDR is phase incoherent (each image element is from a source at a different minicomputer), the intensities of the spatial Fourier transforms add. More than one image in a row of the ADDR array corresponds to the situation of a conflicting call request. Each image element in a row of ADDR causes an additional unit of intensity for the Fourier transform in the x direction. The level slicing operation is used to isolate the situation when only one call request is made to a particular destination address. This means that the Fourier transform should have only one unit of intensity. If no requests are made to a destination address, the Fourier transform intensity is zero; if more than one request is made to a destination address, the Fourier transform intensity is more than one unit. The level slicer array passes the vertical array elements corresponding to input elements to locate elements in the busy status checking subsystem having one unit of intensity.

Since the system is required to consider the call originator as a busy subscriber during the time that the request is processed, information regarding the identity of all originators must also be included in the busy status checking operation. This is done in the left hand path along the left side of FIG. 17. Since the address of the originator is coded by horizontal position, this information must be rotated to an equivalent vertical address position, and the originator address information is processed with the Fourier transform operations described above for the destination address. The outputs of the Fourier transforms for the destination and originator address checks are added and collectively comprise the input to the threshold detector arrays.

For the busy status checking operation, the input information is coded in the vertical spacing of the spacial Fourier transforms, and the additive intensities of the output of the transformation are found at a given vertical position. Since the horizontal position contains no information, the operations for the busy status check are performed with one dimensional arrays of elements. This is accomplished by sampling the output of the Fourier transform system along a slit in the vertical direction. In terms of spatial frequency, this corresponds to an optical zero frequency spatial filter in the y direction.

The level slicing operation is performed by using two threshold detectors, as shown in FIG. 17. The inputs to the detectors are spatially identical, but the input to the second threshold detector, $S_2$, has been attenuated 3 dB. The feedback attenuation coefficients for both of the detectors are equal. This means that the threshold detection for the second component requires twice the input intensity, than required of the first detector, to actuate. When the first image element in time has an output of one for a vertical image element, there is at least one call request to the address specified by position of that element. When the second detector has an output of one for a vertical image element, there are two or more call requests for the address specified by the position of the element. The desired situation for connection of a request is one and only one request to a given destination address, therefore the outputs of $T_1$ and $T_2$ at the bottom of FIG. 17 are both for elements corresponding to competing requests for connection. This gives a zero out of the AND gate with one negative input.

After the level slice operation, the busy status check is complete, but the horizontal position of the connection request has been lost in the Fourier transformations at the input to the threshold detectors. To re-establish the horizontal position of the request, the output of the level slicing AND gate array, N, is Fourier transformed in the x direction to restore the two-dimensionality, and the square array, N, is ANDed with the output of the first delay gate from the clocking subsystem. The output of this array of AND gates, D, is the input to the holding subsystem, and again has an x-y position corresponding to the non-zero elements of the crosspoint matrix in the switching operation. The only non-zero elements in D correspond to the connection requests that are approved by the busy status check.

The holding subsystem is a square array of master-slave flip-flops called MS F/F in the upper right of center in FIG. 17. The input to the holding subsystem is the output of the busy status checking subsystem. The input array is limited to non-zero elements in positions corresponding to the crosspoint matrix that connects the transmission lines of request originators to the reception lines of request destinations. In addition, only elements corresponding to requests that are approved by the busy status checking subsystem are non-zero. Elements of this array are fed through D into the master flip-flop array when the clock pulse is set to one for these elements. At the time of the clock pulse transition from one to zero for a flip-flop array element, the input intensity of D for that element is transferred from the master flip-flop to the slave, as shown in FIG. 16. Requests approved by the busy status check are transferred to the slave output and held until the element is clocked again. If a request is denied by the busy status check, a zero is stored in the flip-flop, and no connection is made.

As auxiliary functions, the holding subsystem provides the BUSY information to originating computers calling an already busy computer, and the holding subsystem also uses the information encoded in the position of non-zero elements of the output of the MS flip-flop to send status information to the other minicomputers in the network, and to enable connection of the return path for the two way communication.

The BUSY and RQST status for connection requests are easily handled by one-dimensional Fourier transformation. Since originator information is position coded in the x direction, BUSY status is determined by a spatial Fourier transform system in the y direction. The output is sampled along a slit and imaged onto the ends of the optical fibers designated BUSY that are connected to the minicomputers. If the intensity of an image element's input to a fiber is a zero when polled after a set amount of time, then the destination computer is busy at the time of the request. A one occurs when a connection is made, therefore the destination is not busy for the request.

In a similar way, RQST status is sent to the destination computer to tell it that it has been connected to an originating computer. This is done by a Fourier transformation in the x direction and a vertical sampling slit. The result is imaged onto the ends of optical fibers corresponding to RQST lines to the minicomputers.

Figure 20:
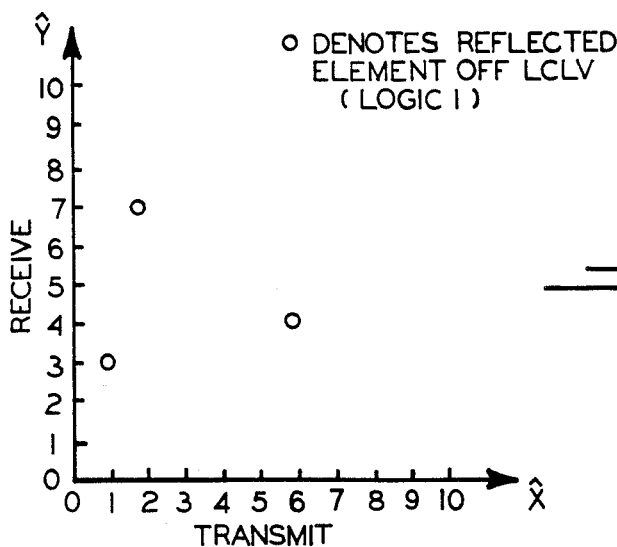
FIG. 20(a) is a graphical representation of Q for a forward transmission.
FIG. 20(b) is a graphical representation of an example of Q for a return transmission.
Figure 20:
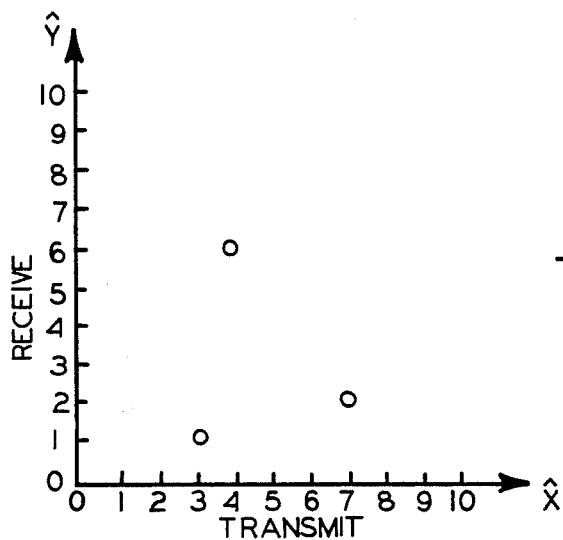
Figure 21:
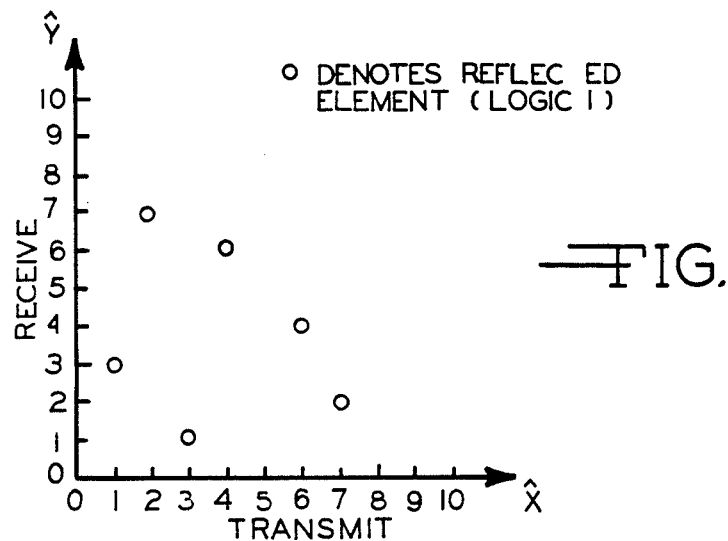
FIG. 21 is a graphical representation of a two-directional Q' matrix.

The crosspoint matrix must also be established for the return communication path. This is obtained optically from the forward crosspoint matrix. Referring now to FIG. 20, the relationship between the forward matrix and the return matrix is demonstrated for an example with three connections. For this example, the connections are between: computer 1 (originator) and computer 3 (destination); computer 2 (originator) and computer 7 (destination); and computer 6 (originator) and computer 4 (destination). In FIG. 20, the position of an array element along the horizontal axis now represents the transmitting XMT lines of the minicomputers involved, and the vertical position represents the receiving RCV lines for the computers. FIG. 20(a) shows the forward matrix and FIG. 20(b) shows the return matrix. These matrices are transposes of each other and the elements of one matrix are mutually exclusive of the elements of the other. This feature of mutual exclusivity permits the forward and return crosspoint matrices of FIG. 20 to be superimposed on each other to create a new crosspoint matrix that handles the two-way communication. Optically, this is accomplished by splitting the output beam of the MS flip-flop and retaining one beam with the Q matrix as is while modifying the second beam. The x-y axes of the second beam are rotated so that x→y and y→x and the two beams are combined as they are imaged onto the same area of the light valve, creating the new crosspoint matrix, Q'. The new matrix for the example shown in FIG. 20 is shown in FIG. 21.

The operation of the control system of the present invention is demonstrated by observing two different request examples. The first example is a request for connection to an idle or non-competing destination. This request is approved by the control system, and the request is connected. The second example request is to a busy destination. For this example, the control does not allow connection between the requesting originator and the destination. The existing communication between the destination computer and a third subscriber remain undisturbed by this request.

Figure 22:
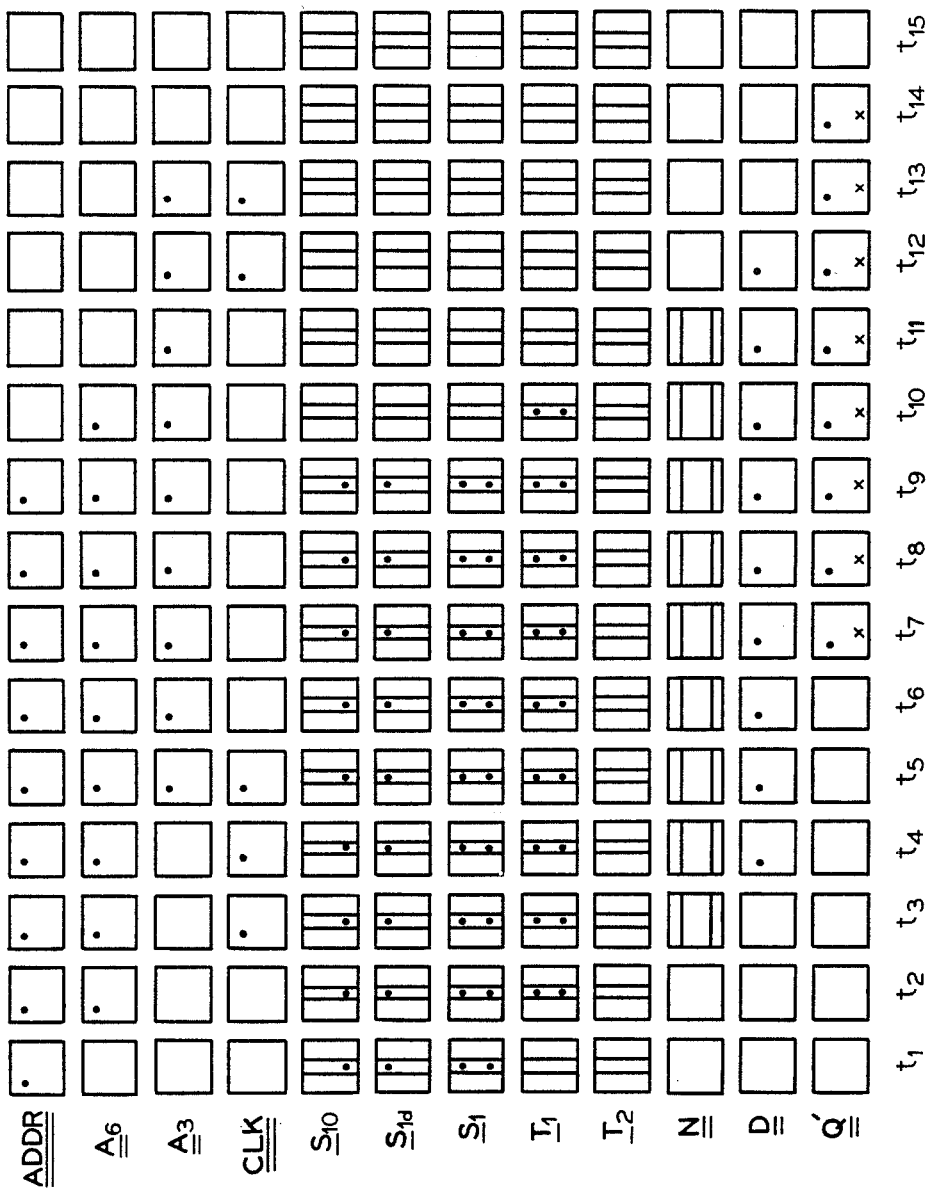
FIG. 22 is a schematic showing a series of photographs for a non-competing request, during operation of the present invention.

The operation of the system is observed by viewing snapshots of the various arrays at the inputs and outputs to the control components at a succession of sample times. Such a series of snapshots for the first example is shown in FIG. 22. The boxes in this figure are snapshots of the arrays, and the time progression of the snapshots is from left to right. The interval between frames is the reaction time of the lighted image elements. The connection request is set-up in time frames $t_1$ through $t_7$, and disconnected in frames $t_{10}$ through $t_{15}$.

For the first example and referring to FIG. 22, the request is initiated by creating a light spot in the ADDR array in frame $t_1$ as shown. Since there are no other spots in the row of the request, this request is to an idle destination. $S_{10}$ shows the equivalent address of the originator for the busy status subsystem, and $S_{1d}$ shows the destination address for the busy status check. The $S_{20}$ and $S_{2d}$ arrays are not shown in this drawing because the non-zero elements in them are in the same positions as the corresponding elements shown and the only distinguishing feature between $S_{20}$ and $S_{2d}$ and $S_{10}$ and $S_{1d}$, respectively is the intensity level of the elements.

$T_1$ has elements that are ones in the positions shown for $t_2$. The $T_2$ vector is zero since there are no competing calls for this example. Since the corresponding elements in $T_2$ are zero, the N is pair of horizontal bars. $A_0$ and N results in the spot in the D array at $t_4$. After the D input is available to the master flip-flop for a frame, the clock pulse changes from one to zero, transferring the spot on the D array from the master output to the slave output. This spot is held until the next clock pulse for that spot. The connection is finally complete at the end of increment $t_7$.

When the two computers are finished with I/O transfer, the originator resets the ADDR lead to zero. The input to the flip-flop is erased for the array element of the connection, and a zero is stored in the slave flip-flop on the one-to-zero transition of the second clock pulse, putting a zero in the flip-flop and disconnecting the data lines of the two computers.

Figure 23:
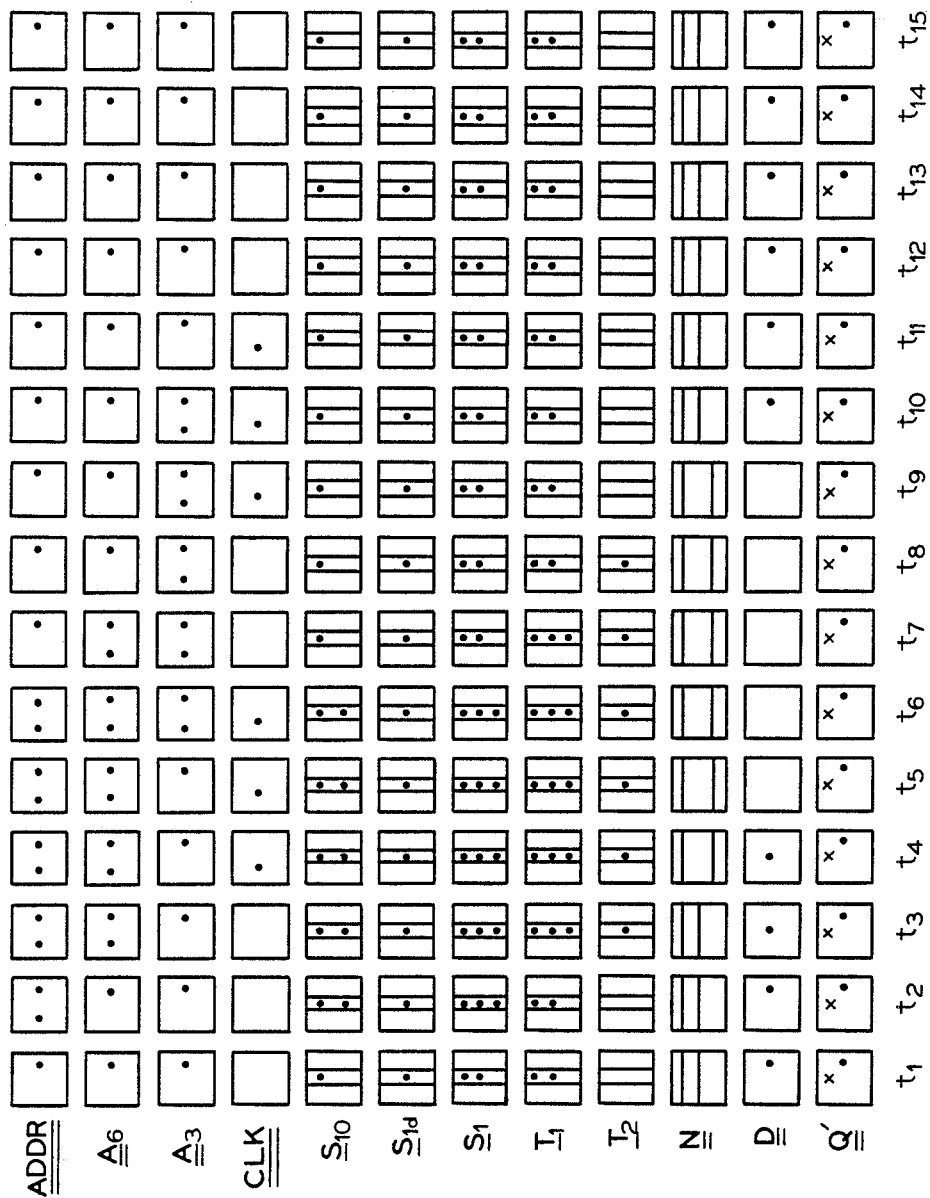
FIG. 23 is a schematic showing a series of photographs for a competing request, during operation of the present invention.

The second example is displayed in FIG. 23. This example depicts a request to a destination that is already involved in communication. The busy state of the destination is shown in frame $t_1$, where spots in the Q' matrix represent a connected two-way communication path. A typical computer originates a request to connect with one of these computers in frame $t_2$. The request is processed in frames $t_2$ to $t_5$ and the originator removes the request in frame $t_7$ because the destination computer is busy. Frames $t_7$ through $t_{10}$ are disconnection operations.

Since more than one spot is in the request row of the ADDR matrix, there is a spot as shown in the $T_2$ vector as shown in frame $t_3$. The spot in $T_2$ causes the line corresponding to the requested destination in D not to appear. Notice that this does not effect the operation of the connected computer pair because the Q' elements already there corresponding to their connection are clocked separately. When the clock pulse changes from one to zero in the example request, a zero is stored in the flip-flop, and not connection is completed.

The preferred embodiment of the optical layout of the control system will now be described. First, the partitioning of the LCLV into areas representing the various control functions will be described. Finally, the optical parts to the control functions will be individually detailed.

The LCLV has approximately one square inch of active surface area with which modulation can be performed. Within this one inch square, the resolution of the device permits 500 to 600 elements per direction, making the light valve capable of handling a single array of 600 by 600 elements or many smaller arrays at the same time. The operation of the optical switching system requires 10 arrays of $N \times N$ elements and 4 arrys of $1 \times N$ elements. Assuming a network of $N = 80$ minicomputers, three complete switching systems can utilize the active area of the same light valve, yet act completely independent of each other.

Figure 24:
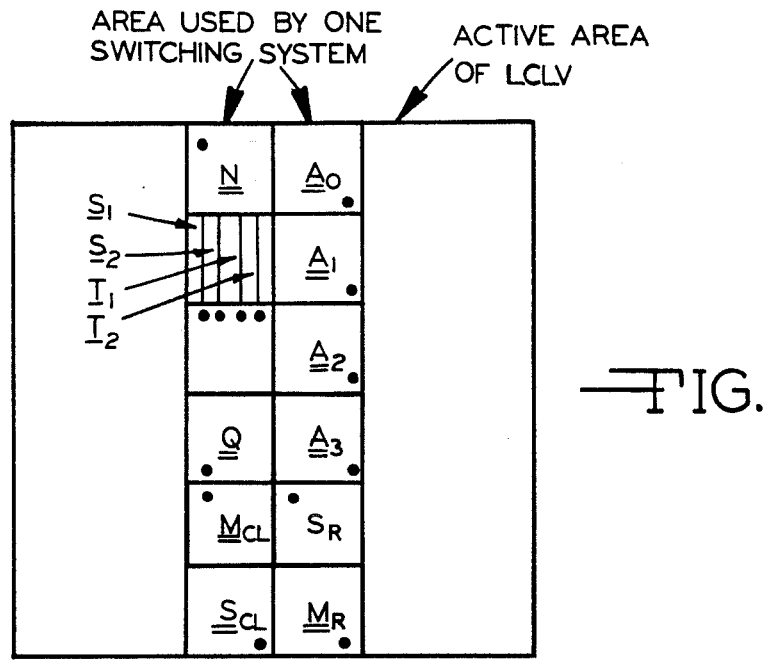
FIG. 24 is a schematic diagram of input area assignments for a LCLV.

The use of one light valve for several operations requires that regions of the active area be assigned for the inputs of the specific functions that are performed. Assignments of area for the operations of the switching system of the preferred embodiment are shown in FIG. 24. The locations of the various arrays are chosen such that a minimum of optical circuitry is necessary to perform the desired functions. The set of arrays is also aligned in two columns to allow for expansion of another system on each side of the system shown, enabling more efficient use of the light valve active area.

Figure 25:
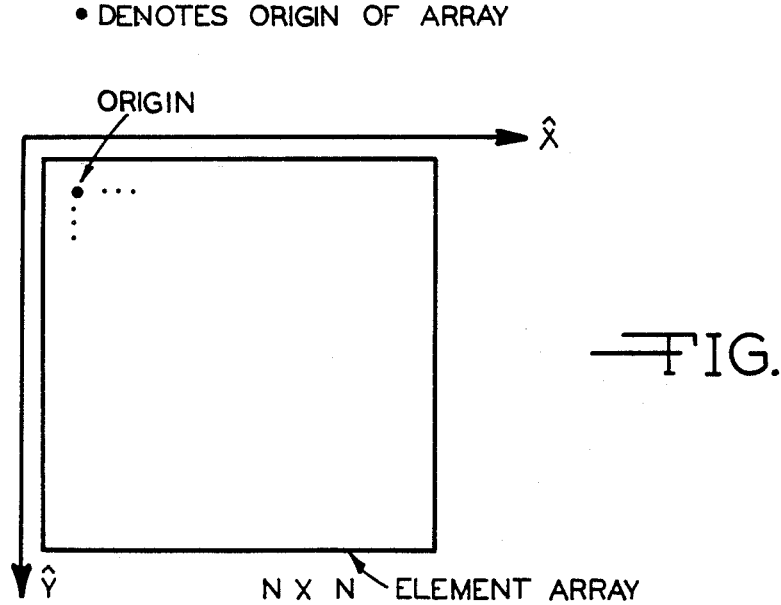
FIG. 25(a) is a schematic showing a origin position for a square array.
FIG. 25(b) is a schematic showing a origin position for a vector array.
Figure 25:
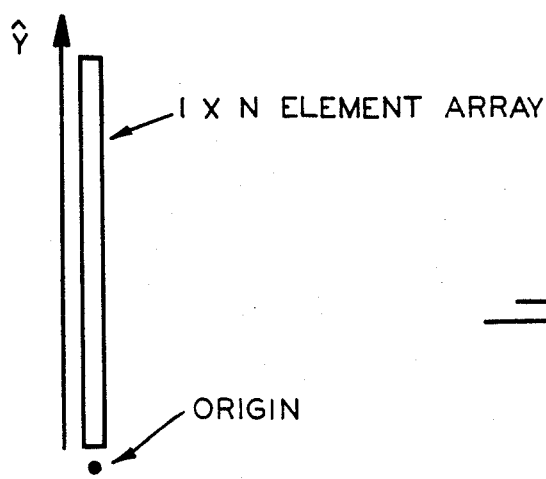

When dealing with an array of elements as input and output of an operation, it is helpful to designate a reference position in the array to allow identification of each element by position. The arrays of $N \times N$ elements are defined by a spot at the origin as shown in FIG. 25(a). The positive x and y axes are oriented with respect to the spot as shown. FIG. 25(b) shows the origin location for a one dimensional array of $1 \times N$ elements. When executing logic functions with an optical circuit, the origins of the inputs to the function must be aligned to allow operation on corresponding elements of the two arrays.

The optical layout of the control system is an interconnection of the components that were discussed previously. The components are interconnected by optical devices such as mirrors, beam splitters, lenses, and prisms. The preferred embodiment of the optics used to connect the components will now be detailed. Due to complexity of the control logic, the system is again divided into three parts for description of the layout: clocking subsystem, busy status check subsystem, and the holding subsystem.

Figures of the side or top views of the subsystem show the layouts, and include a frame describing the active areas used on the read and write sides of the LCLV for the operations performed, along with the dot in the appropriate place to signify the origin of each array. Dashed lines in these drawings represent image planes along a beam path, and the orientation of each array contained in the beam is given to assist in tracing images through the layouts.

For a given area on the light valve, the read beam and the write beam for the area must be incident on the respective surface of the LCLV at the same angle to preserve the same correspondence of the image elements. In some of the drawings, details of the necessary optics for accomplishing the proper angular alignment of the read beam and the write beam have been omitted in order to clearly describe the operations performed, without unnecessary complication.

Figure 26:
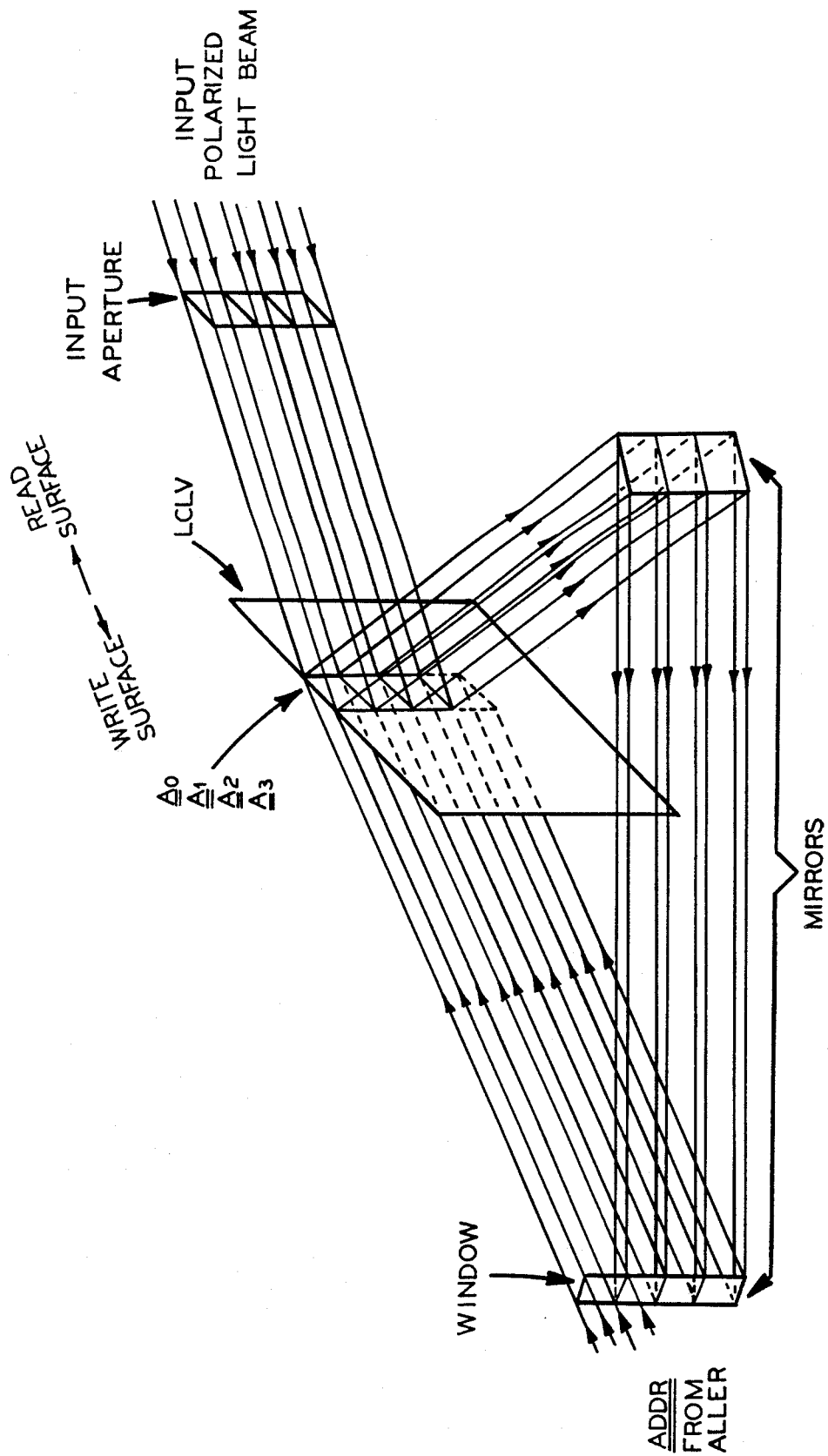
FIG. 26 is a schematic showing a three-dimensional view of delay gate arrays.
Figure 27:
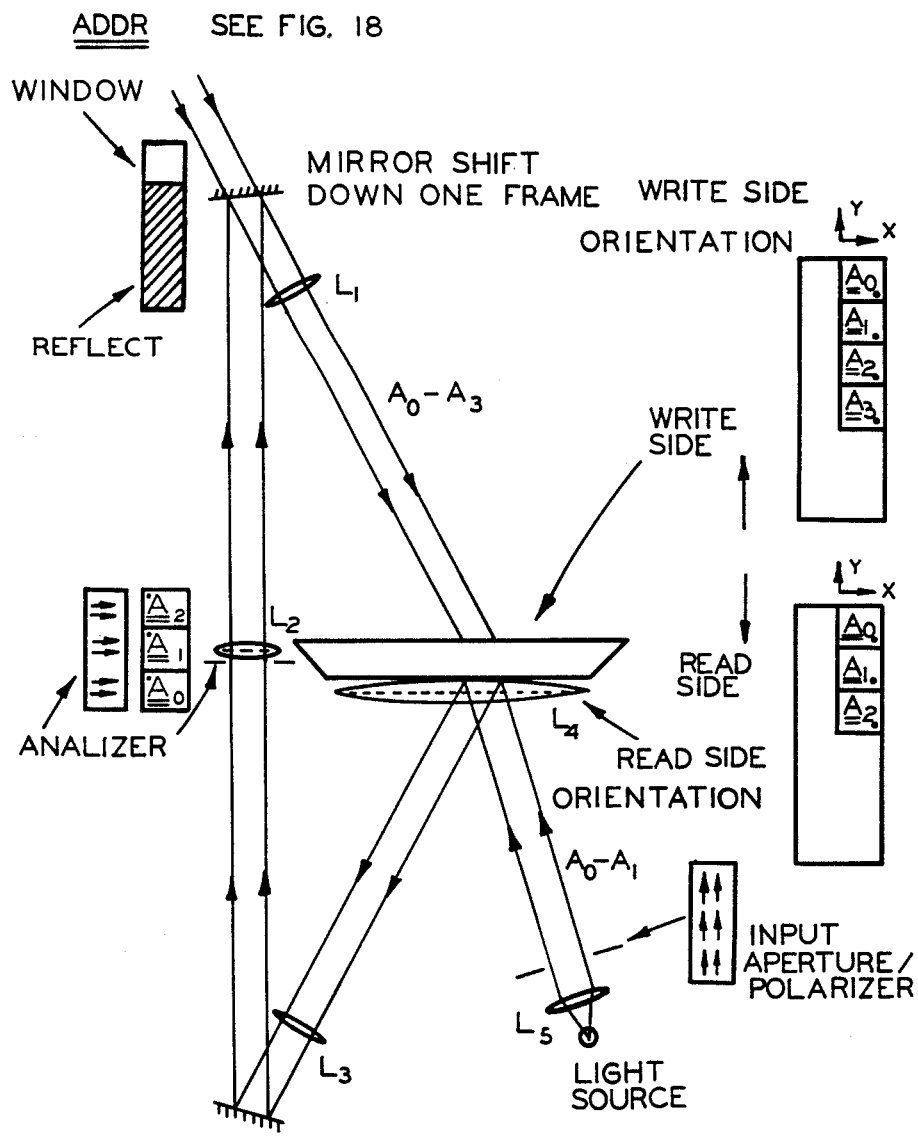
FIG. 27 is a schematic top view of the delay gate arrays.

The layout for the clocking operation is divided into two operations: a succession of delay gate arrays, and an exclusive-OR array. FIG. 26 shows a three-dimensional view of the delay gates for $A_0$ through $A_3$, and FIG. 27 shows a top view of the same delay gates. The lenses and polarizers have been omitted from FIG. 26 to clarify the placement of mirrors and the areas of the light valve surfaces involved in the operation. FIG. 27 shows the delay gates with the lenses and polarizers placed in position. The input to the first delay gate, and therefore the clocking subsystem, is the image of the ADDR array from the optical fibers as shown in FIG. 18. The output of each delay gate is shifted down one frame to become the input to the next delay gate. The lenses in FIG. 27 are a field-relay system.

Figure 28:
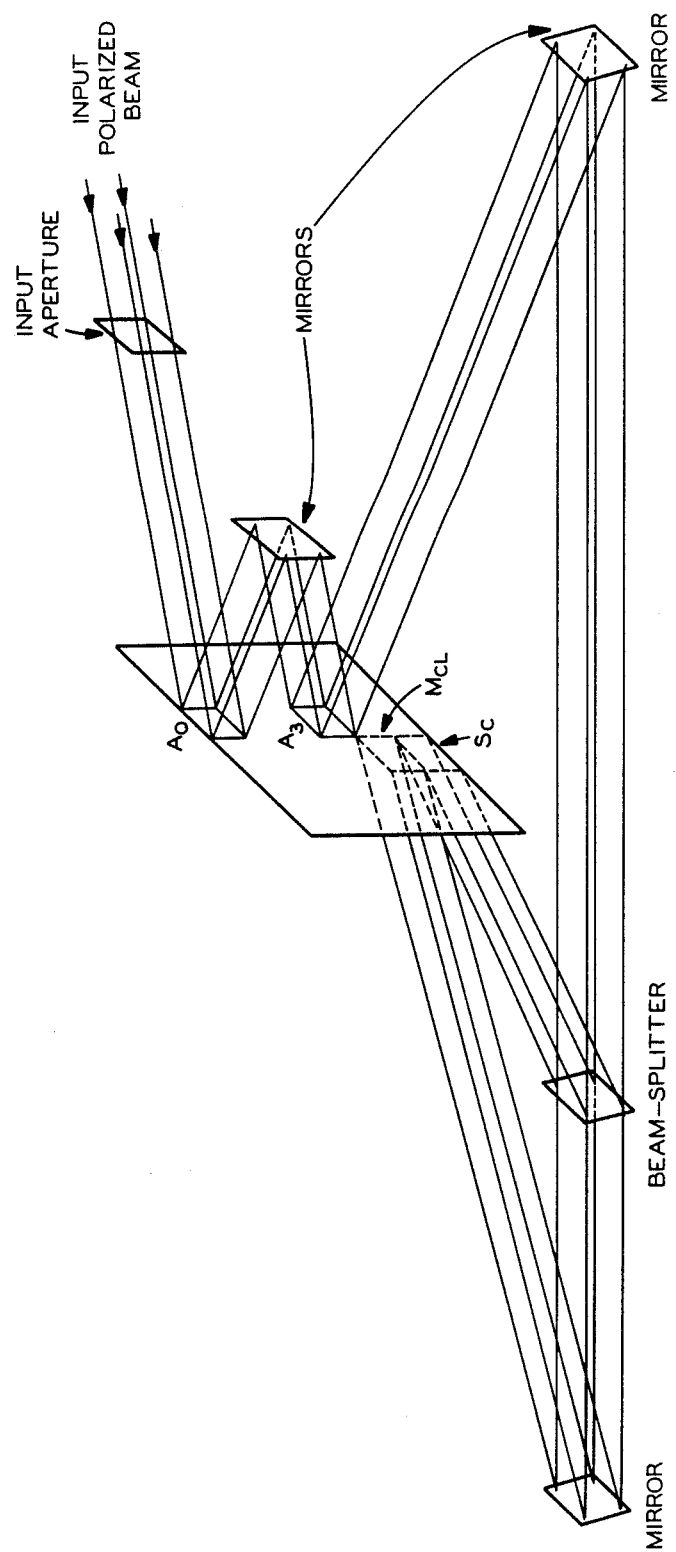
FIG. 28 is a schematic showing a three-dimensional view of $A_0$ XOR $A_3$.
Figure 29:
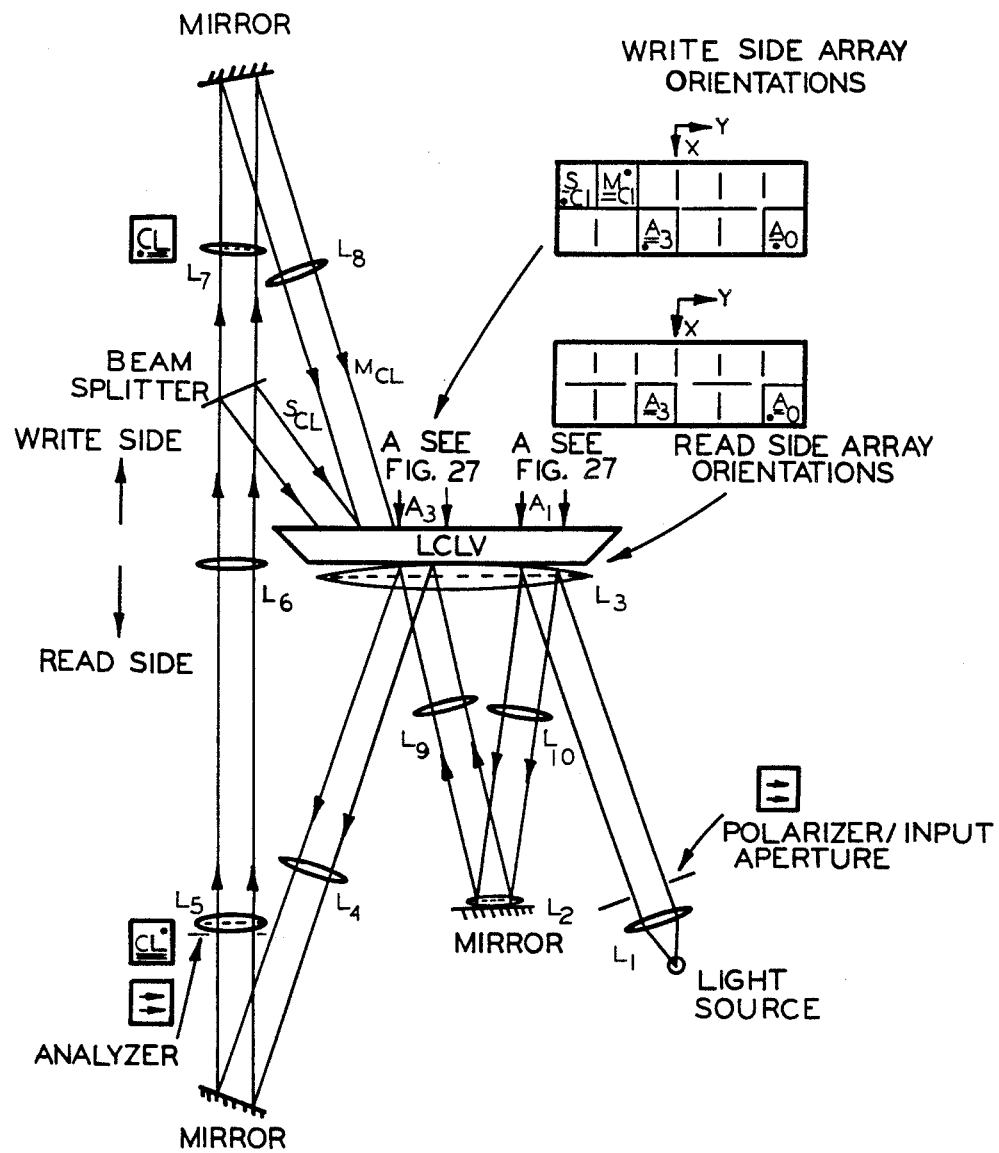
FIG. 29 is a schematic showing a side view of $A_0$ XOR $A_3$.

FIG. 28 shows a three-dimensional view of the operation $A_0$ XOR $A_3$ without lenses or polarizers, and FIG. 29 shows a side view of the same operation. For this operation, the read beam travels vertically and is bounced off the $A_0$ and $A_3$ areas in succession (the beam path lies in the yz plane). The mirrors, lenses and polarizers are oriented to provide proper alignment of the respective elements of the input arrays. The output beam of the array of XOR gates is split and projected onto the two clock areas for the MS flip-flop, $M_{c1}$ and $S_{c1}$, as shown in the figures. The lens system in FIG. 29 is a relay-field lens system. The clock areas are identical and placed one above the other on the write surface of the LCLV.

Figure 30:
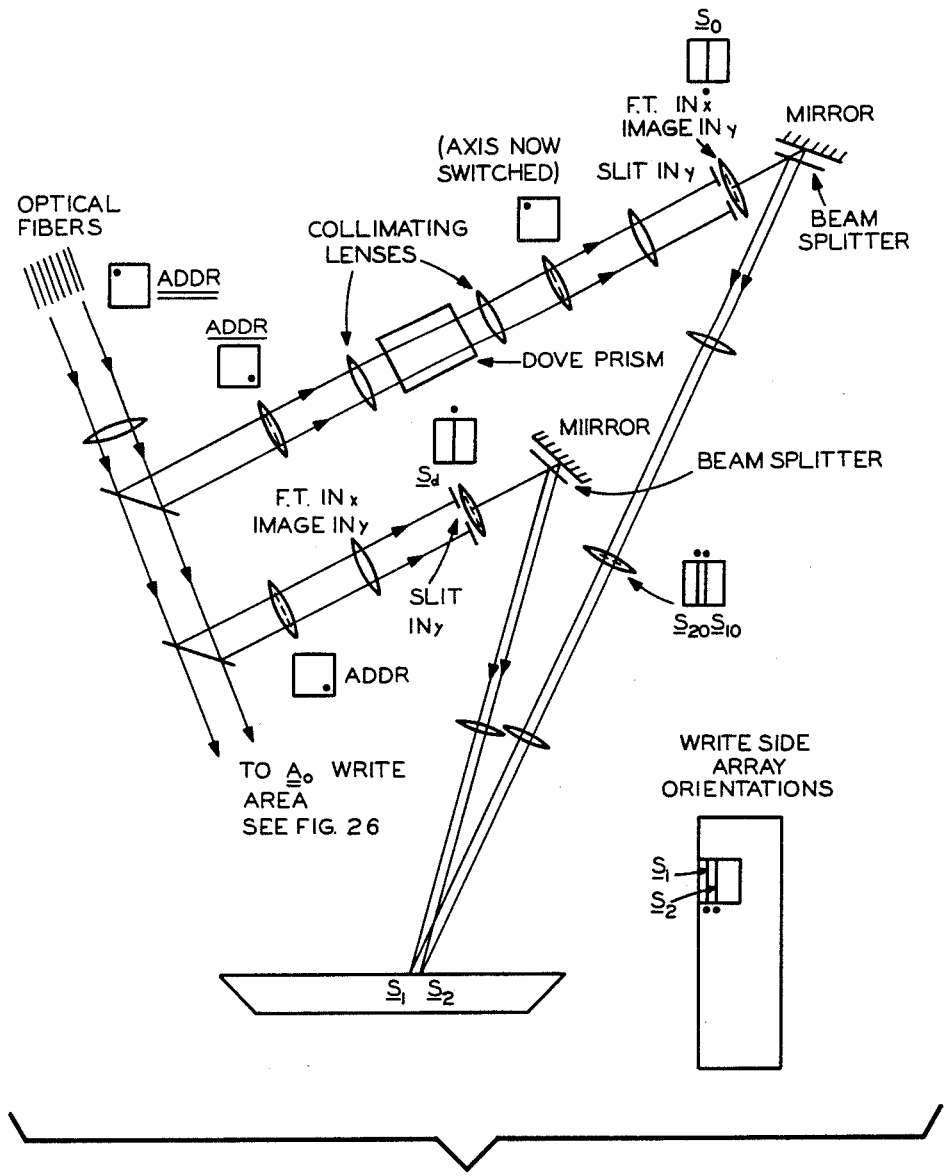
FIG. 30 is a schematic showing a top view of input optics for threshold detector arrays.

The busy status checking subsystem, as previously detailed, is composed of a pair of threshold detector arrays and a level slicer array. FIG. 30 shows a top view of the input to the threshold detector arrays. This layout corresponds to the vertical lines along the left side of FIG. 17. The input to this layout is the ADDR array from the optical fibers shown in FIG. 18 and also used as an input to the clocking subsystem.

In FIG. 30, the ADDR beam is split twice. The first beam split away is transposed such that x→y and y→x by a dove prism. This first beam is Fourier transformed in x and image in y, then sampled through a vertical slit. The vertical line of elements is split into two adjacent lines of elements, $S_{20}$ and $S_{10}$. These lines are identical except that elements in $S_{20}$ have half the intensity of the corresponding elements in $S_{10}$. These are imaged onto the LCLV $S_2$ and $S_1$ areas, respectively, as shown in FIG. 24. The second beam that is split away is Fourier transformed in x and imaged in y. This beam is also sampled along a vertical slit, split into two beams, $S_{1d}$ and $S_{2d}$ with the same relationship mentioned above. These beams are also projected onto $S_1$ and $S_2$, respectively as shown in FIG. 24. The straight-through beam is imaged onto $A_0$ of FIG. 24 for input to the clocking subsystem shown in FIG. 27.

Figure 31:
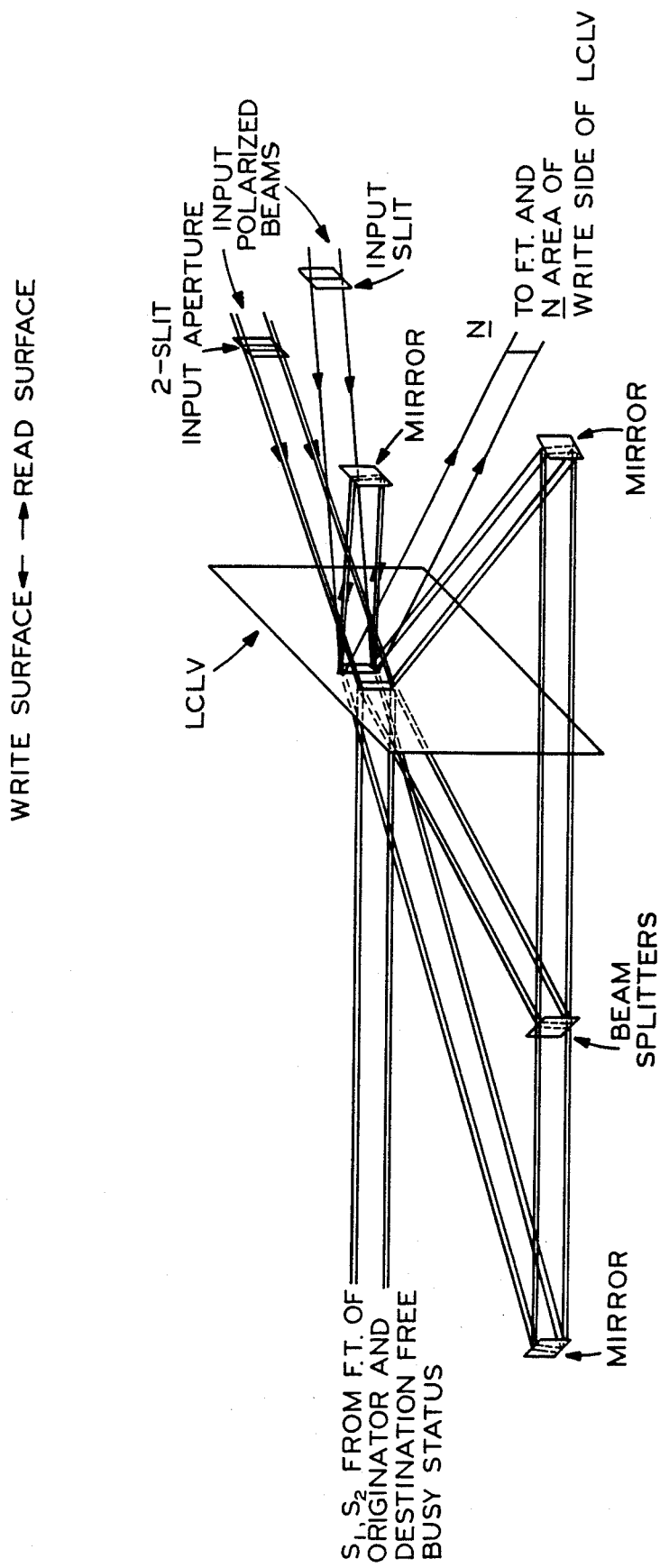
FIG. 31 is a schematic showing a three-dimensional view of a BUSY status check.

A three-dimensional view of the interconnection of the threshold detector and level slice arrays is shown in FIG. 31. This figure shows three operations: the external input $S_1$ and $S_2$ are projected onto their prospective areas on the write side of the light valve; the read beam for the $S_1$ and $S_2$ vectors is split and projected onto the input areas for the level slice array, $T_1$ and $T_2$ and fedback to the input areas for the threshold detectors, $S_1$ and $S_2$; and the AND operation between $T_1$ and $T_2$ is performed by successive reflections of these areas on the read side of the LCLV.

Figure 32:
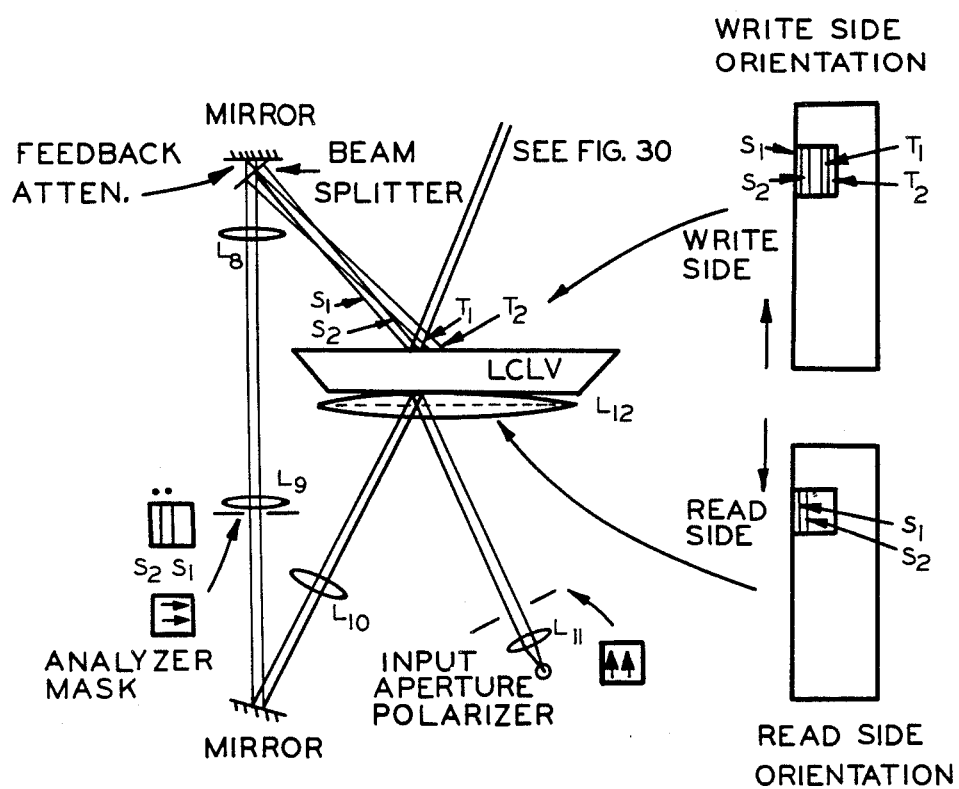
FIG. 32 is a schematic showing a top view of threshold detector arrays.

FIG. 32 shows the feedback loop for the threshold detector arrays. The input to the threshold detector arrays are vertical linear arrays that are shown in FIG. 30. The threshold detector array is similar to the one detailed earlier in the discussion of FIG. 15 except that the feedback beam is split and imaged onto the inputs to the level slicer and the inputs to threshold detector arrays. The attenuation coefficient for the feedback loop is adjusted by the transmission of the beam splitter.

Figure 33:
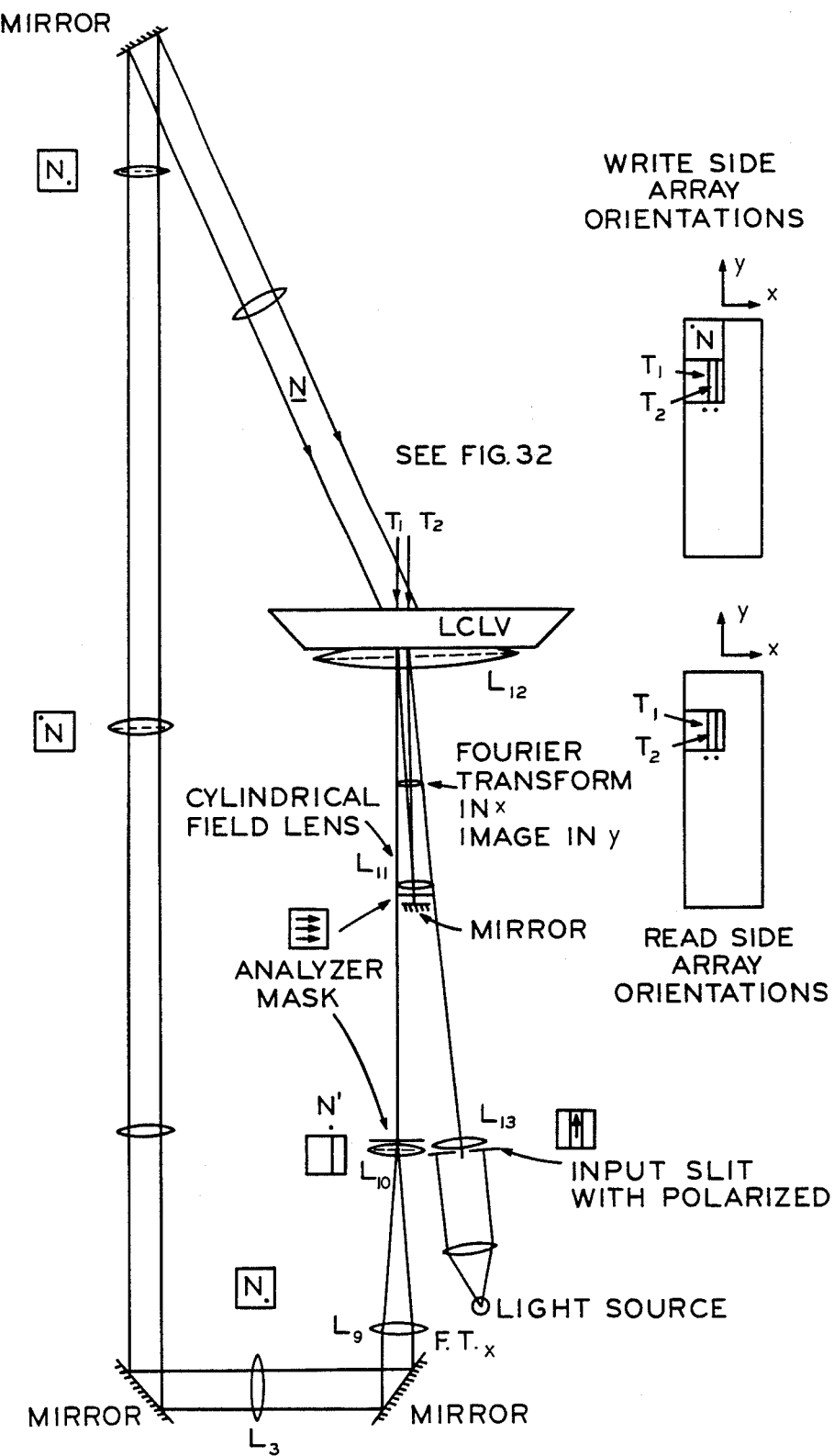
FIG. 33 is a schematic showing a top view of a level slice array.

FIG. 33 shows a top view of level slice layout. This drawing consists of an array of AND gates in which the $T_2$ array input to the gate is negative true logic. The input vectors are the outputs of the threshold detector arrays. To image the arrays for the successive bounces off the LCLV, an elliptical lens is used to Fourier transform the reflected $T_2$ image onto a tipped mirror. An intermediate polarizer analyzer is place before the mirror. The beam is directed back through the analyzer and Fourier transform lens onto the $T_1$ array, then reflected off the LCLV and directed through an output analyzer. The output of the AND gate array is Fourier transformed in x (imaged in y), and projected onto the N write area by a relay-field lens system.

Figure 34:
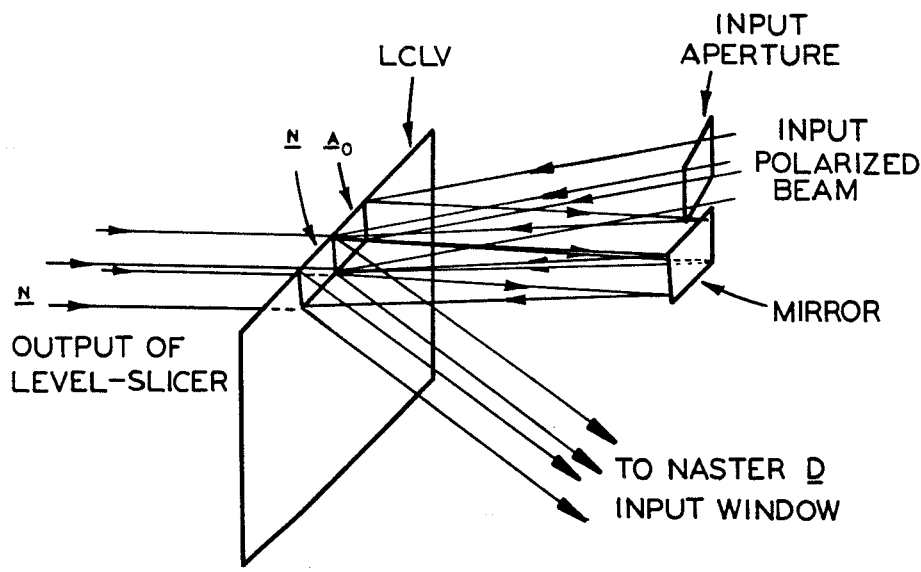
FIG. 34 is a schematic showing a three-dimensional view of $A_0$ AND N.
Figure 35:
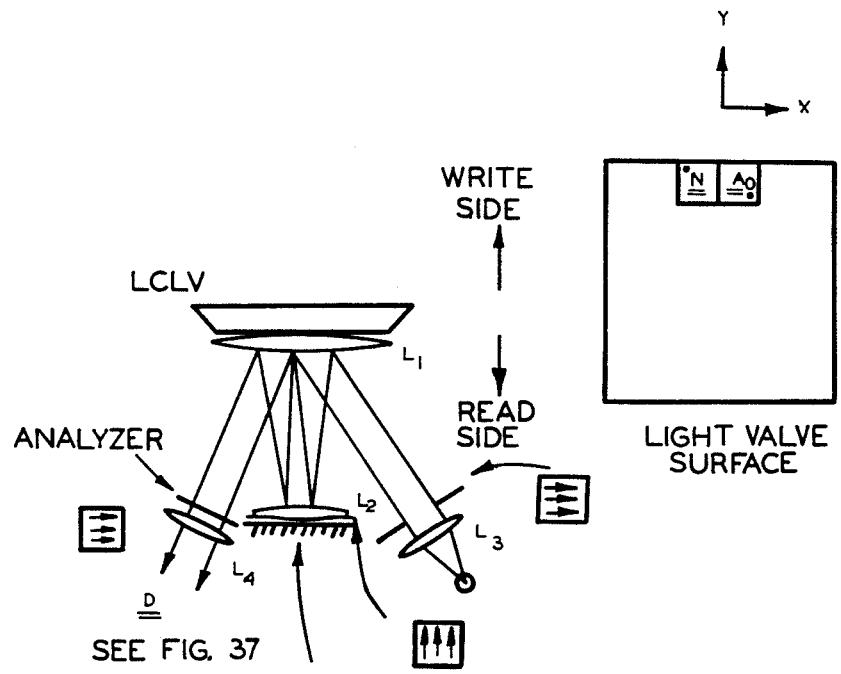
FIG. 35 is a schematic showing a top view of $A_0$ AND N.

The AND operation of N with $A_0$ to restore the horizontal position of the request address is shown in FIGS. 34 and 35. FIG. 34 is a three dimensional diagram of the two bounce logic gate array, and FIG. 35 is a top view of this component. Both of the drawings describe the AND operation. The output beam, D, is the input to the master-slave flip-flop in the holding subsystem, and is horizontally polarized to be able to pass through the input window.

Figure 36:
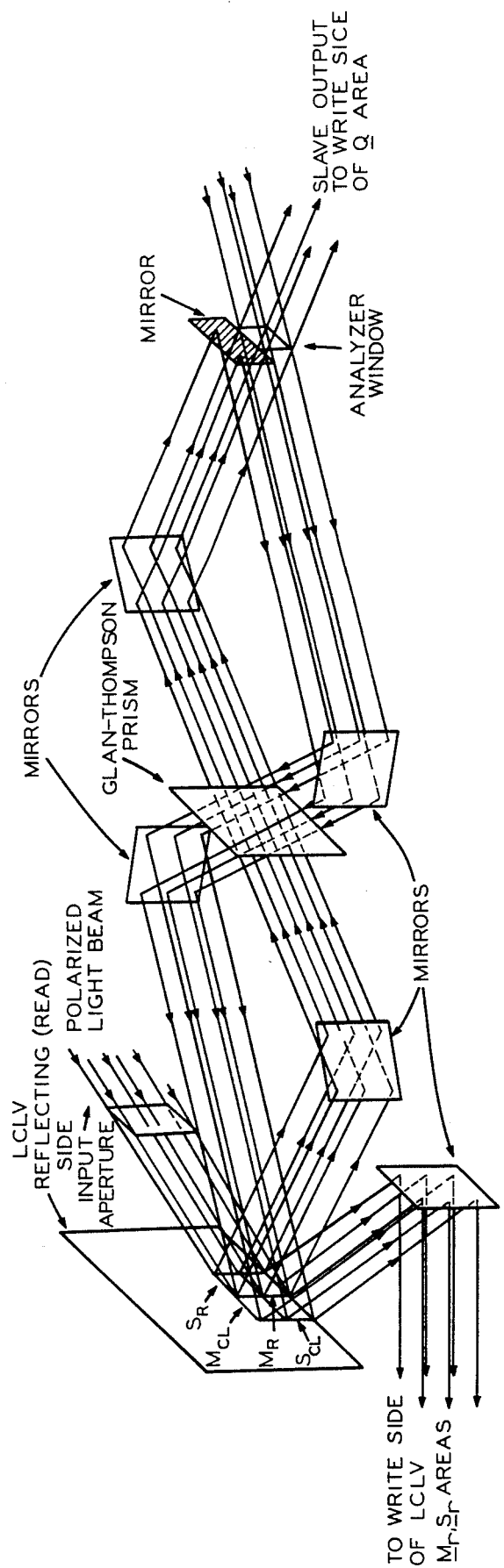
FIG. 36 is a schematic of a three-dimensional view of an MS flip-flop cavity.
Figure 37:
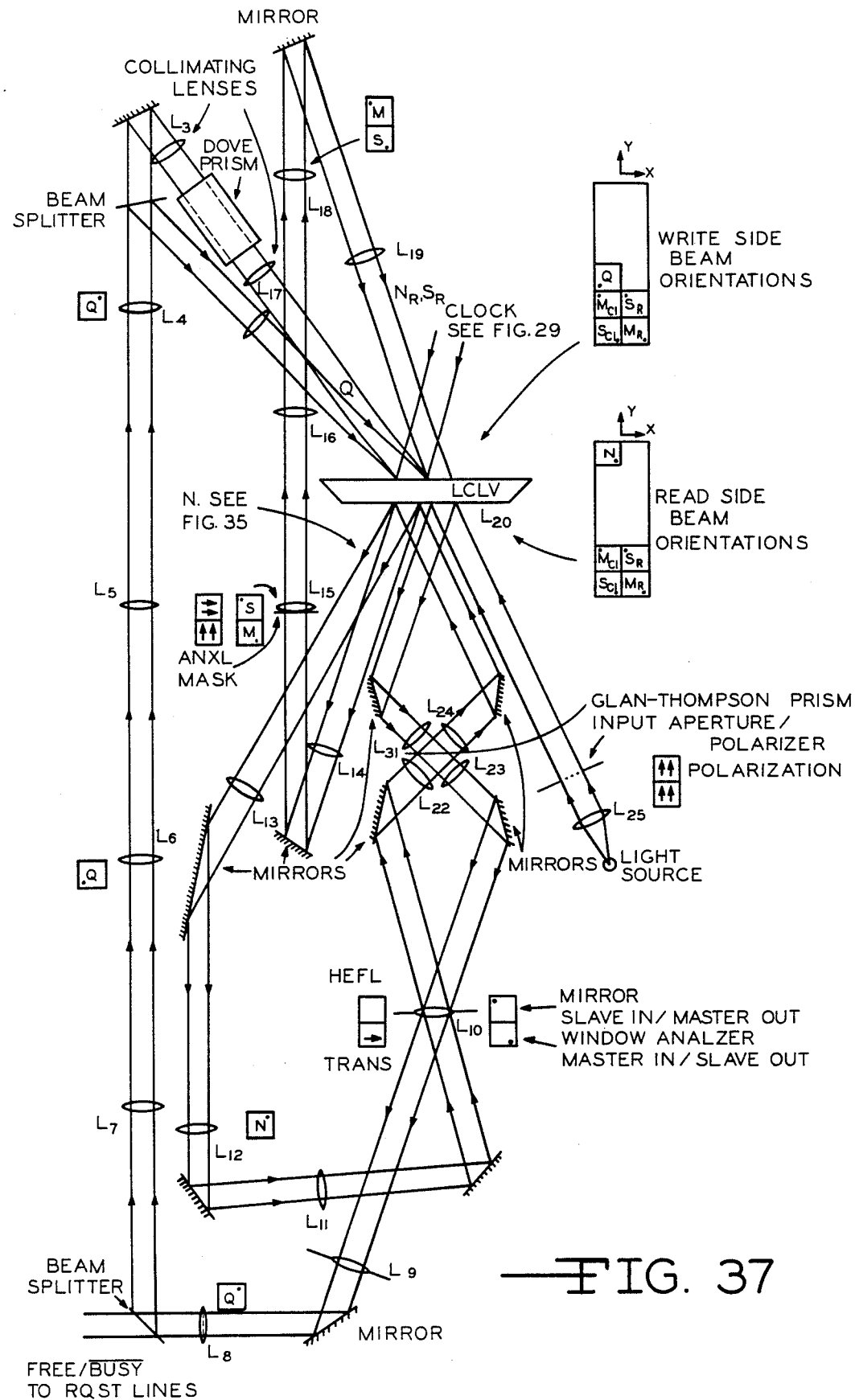
FIG. 37 is a schematic of a top view of a holding subsystem.

The holding subsystem consists of a master-slave flip-flop and three auxiliary optical operations. A three-dimensional view of the cavity of the MS flip-flop is shown in FIG. 36, with a top view of the holding subsystem shown in FIG. 37. The operation of the master-slave flip-flop has been detailed earlier, therefore the following discussion of the holding subsystem is limited to the input beam to the MS flip-flop, and the operations performed on the output beam.

FIG. 36 shows mirror orientations for the cavity of the MS flip-flop. The mirrors shown (and the lenses not shown) allow the right hand image plane to be used as both an input and output plane. Although FIG. 37 appears very complicated, much of the layout is the MS flip-flop detailed earlier, in explanation of FIG. 16. The lenses, mirrors, and polarizers are the same as those detailed in FIG. 16. Important information in this drawing include the optics involved in manipulating the output of the flip-flop to provide the crosspoint matrix for data line connections (Q') and RQST and BUSY status to the computers involved in a connection request. The input to the flip-flop is the beam reflected off the N area on the read side of the LCLV from the busy status subsystem. This beam is imaged onto the input window of the MS flip-flop as shown in the center of the FIG. 37. The creation of Q' is performed in the upper left of the figure with a dove prism, and the status information manipulation is performed after the flip-flop output is split away in the lower left.

Figure 38:
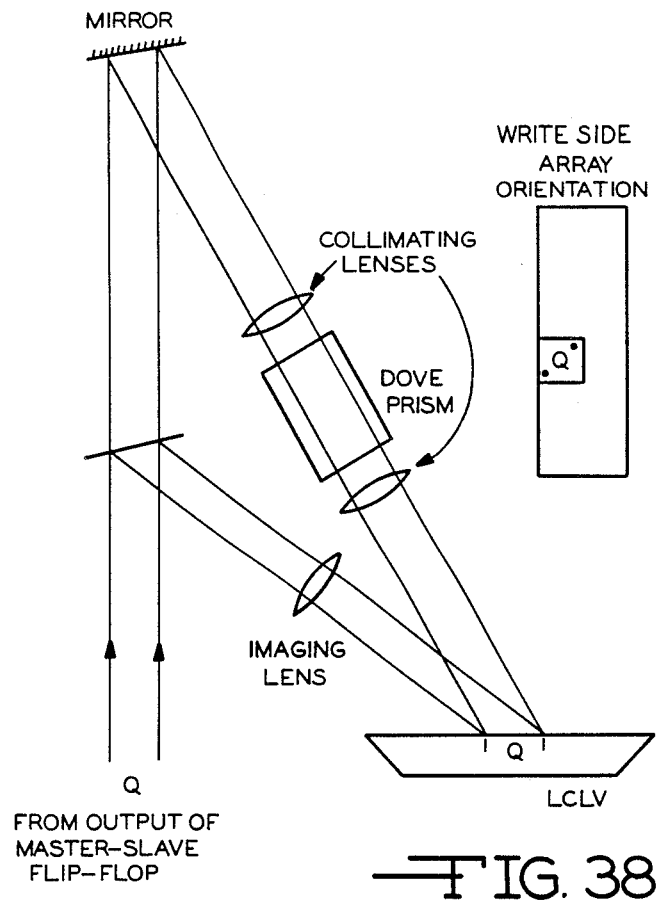
FIG. 38 is a schematic of a top view of axis switching optics.

A closer view of the Q' matrix creation is shown in FIG. 38. In this figure, Q is the output of the MS flip-flop. The Q beam is split, with one part being imaged directly onto the Q' write area of the light valve as shown, and the other part passing through a dove prism to switch the coordinate axes.

Figure 39:
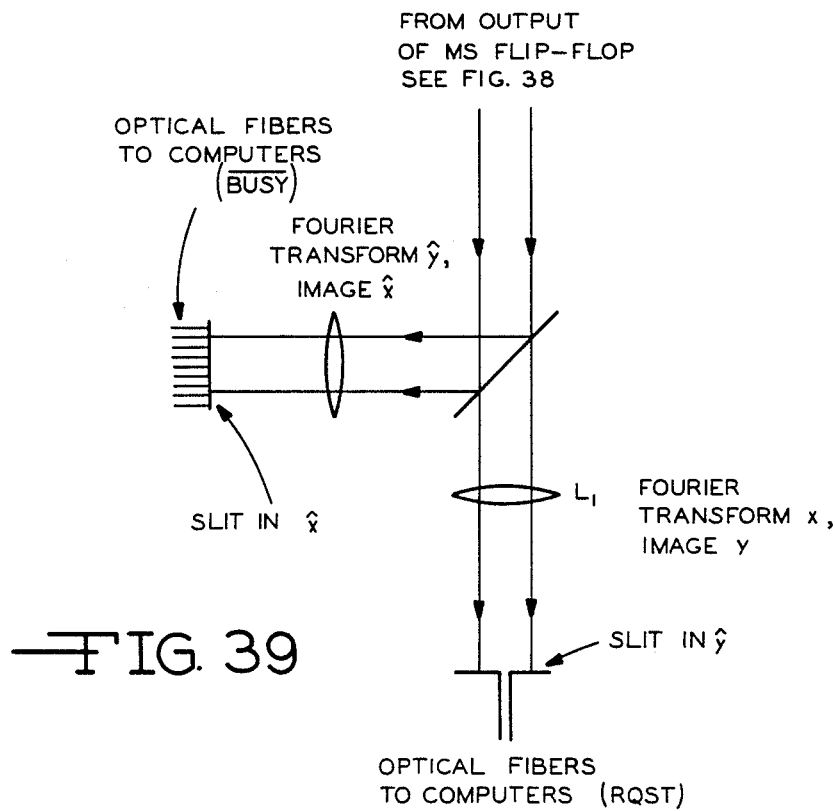
FIG. 39 is a schematic of a top view of Fourier transforms for status lines.

FIG. 39 shows the optical manipulation used to provide status to the subscribing minicomputers. The manipulation is accomplished by two different Fourier transforms. The Q beam is split as shown in the figure. The left beam is Fourier transformed in y and imaged in x. The Fourier transform is sampled along a slit in the x direction, allowing the BUSY status to be imaged onto the ends of a line of optical fibers connected to the minicomputers. The bottom beam is Fourier transformed in x and imaged in y. The Fourier transform is sampled this time through a slit along the y axis and imaged onto the ends of a vertical line of optical fibers connected to the computers.

The foregoing discussion detailing the description of the preferred embodiment of the present invention relates with detailed specificity one application of an optical switching system for use in networks of intercommunicating electronic and electromechanical devices. It is intended and understood that other embodiments of the present invention may be developed without departing from the spirit and scope of the following claims.

What we claim is:

1. An improved switching system for forming a plurality of individual interconnecting electronic or electromechanical devices into a network comprising a unitary optical control member having a photosensitive surface and a photomodifying surface, said optical control member including a plurality of light sensitive spots arranged in an array, said array being divided into subarrays, each of said subarrays having said light sensitive spots to relate to each of said individual devices, wherein said light sensitive spots within certain specified subarrays are individually responsive to control requests supplied by said individual devices in said network to connect specified devices for data transfer and certain light sensitive spots within other specified subarrays individually provide connections between said devices for such data transfer, and means for connecting said optical control member with said individual devices including a combination of imaging and Fourier transforming optical members for providing a communication input with each of said devices to designated spots in said subarrays and a communication output with each of said devices from such designated spots in said subarrays.

2. The improved switching system of claim 1, wherein said means for connecting said optical control member with said individual devices provides for parallel processing of such control requests and such data transfer between said individual devices through said optical control member.

3. The improved switching system of claim 1, wherein said means for connecting said optical control member with said individual devices provides for two-way communication between said individual devices through said optical control member.

4. The improved switching system of claim 1, wherein said means for connecting said optical control member further includes fiber optic cables connected between said combination of imaging and Fourier transforming optical members and each of said devices.

5. The improved switching system of claim 4, wherein said fiber optic cables connect each of said individual devices with said optical control member through said imaging optical members.

6. The improved switching system of claim 4, wherein each of said fiber optic cables include a plurality of optic fibers.

7. The improved switching system of claim 6, wherein each of said fiber optic cables include an optic fiber specifically designated for each of said devices in such network plus four additional optic fibers.

8. The improved switching system of claim 7, wherein each of said optic fibers connected with said imaging and Fourier transforming optical members specifically designated for each of said devices is individually designated to address a selected individual device, two of said additional optic fibers are specifically designated as status information fibers for providing status information relating to said devices in such network, and two of said additional optic fibers are specifically designated as communication fibers through which such data transfer passes between specified devices.

9. An improved switching system for forming a plurality of interconnecting electronic or electromechanical devices into a network comprising a liquid crystal light valve having a photoactive surface with a plurality of light sensitive spots arranged in an array, said array being divided into subarrays, each of said subarrays having light sensitive spots position-coded to relate to each of said devices, wherein certain specified subarrays are responsive to control requests supplied by said devices in said network to connect specified devices for data transfer and certain other specified subarrays provide connections between said devices for such data transfer, and a combination of imaging and Fourier transforming optical members including an addressing circuit for receiving a request for connection from a first device and directing such request to a second specified device, a status check circuit for determining if the specified device is in condition to accept such request for connection, and a clocking means for receiving information from said addressing circuit and said status check circuit wherein said clocking means completes such connection between said first device and said second specified device as a function of such information received from said addressing circuit and said status check circuit.

10. The improved switching system of claim 9, wherein said addressing circuit includes a plurality of optical delay gates, wherein such addressing request is delayed and said status check circuit operates to determine the status of said second specified device during such delay.

11. The improved switching system of claim 9, wherein said clocking means completes such connection between said first device and said second specified device only if such information received from said status check circuit indicates that said second specified device is not communicating with a third device and is able to receive such communication request from said first device.

12. The improved switching system of claim 9, wherein said clocking means comprises a master-slave flip-flop circuit composed of a combination of optical imaging elements and said liquid crystal light valve.

13. The improved switching system of claim 9, wherein said addressing circuit includes a combination of optical imaging and Fourier transforming elements said liquid crystal light valve.

14. The improved switching system of claim 9, wherein said status check circuit includes a combination of optical imaging and Fourier transforming elements and said liquid crystal light valve.

15. The optical switching system of claim 9, wherein said liquid crystal light valve receives control information inputs from said addressing circuit, said status check circuit and said clocking means and receives data transfer information between said first device and said second specified device and accomplishes the transfer of such control and data information by means of optical functions.

16. The optical switching systems of claim 15, wherein said liquid crystal light valve controls the output light intensity of such control and data information as a function of said input light intensity.

17. The optical switching system of claim 16, wherein said liquid crystal light valve incorporates optical matrix multiplication through digital optics for such data transfer information beween said first device and said second specified device.

18. An improved switching system for forming a plurality of intercommunicating electronic or electromechanical devices into a network comprising a liquid crystal light valve connected to said devices by a combination of imaging and Fourier transforming optical members and fiber optic cables, said optical members combining with said liquid crystal light valve to provide: a control center having an addressing circuit for receiving a request for communication from a first device and directing such request to a second specified device, a status check circuit for determining if such specified device is in condition to accept such request for connection, and a clocking means for receiving information from said addressing circuit and said status check circuit, said clocking means completing such connection between said first device and said second specified device as a function of such information received from said addressing circuit and said status check circuit; and, a data transfer center through which said first device and said second specified device input and output data by means of said optical members and said liquid crystal light valve.

19. An improved switching system for forming a plurality of intercommunicating electronic or electromechanical devices into a network comprising a unitary spatial light modulator connected to said devices by a combination of imaging and Fourier transforming optical members and fiber optic cables:

said spatial light modulator valve including; a photosensitive surface and a photomodifying surface in integral communication with said photosensitive surface, said photosensitive surface of said spatial light modulator being partitioned to receive individual arrays of light relating to individual devices from said combination of optical members, said spatial light modulator controlling the ouput light intensity from said photomodifying surface as a function of said input light intensity, said spatial light modulator incorporating optical matrix multiplication to provide control and data transfer communication between a first device and a second specified device;

said optical members in combination with said spatial light modulator providing an addressing circuit for receiving a request for communication from said first device and directing such request to said second specified device, a status check circuit for determining if said second specified device is in condition to accept such request for communication, and a clocking means for receiving information from said addressing circuit and said status check circuit, said clocking means completing such connection between such first device and said second specified device as a function of such information received from said addressing circuit and said status check circuit;

and optic cables each including; a plurality of optic fibers, each of said optic fibers specifically designated for each of said devices in such network plus four additional optic fibers, said optic fibers specifically designated for each of said devices being individually designated to address a selected individual device, two of said additional optic fibers being specifically designated as status information fibers for providing status information relating to said devices in such network, and two of said additional optic fibers being specifically designated as communication fibers through which such data transfer passes between specified devices, wherein said spatial light modulator, said optical members and said optic cables provide for two-way communication and parallel processing of such control request and such data transfer between said individual devices.

20. An improved switching system for forming a plurality of interconnecting electronic or electromechanical devices into a network comprising a liquid crystal light valve having a photoactive surface with a plurality of light sensitive spots arranged in an array, said array being divided into subarrays, each of said subarrays having said light sensitive spots position-coded to relate to each of said devices, wherein certain specified subarrays are responsive to control requests supplied by said devices in said network to connect specified devices for data transfer and certain other specified subarrays provide connections between said devices for such data transfer, and a combination of imaging and Fourier transforming optical members for providing a communication input with each of said devices to designated spots in said subarrays and a communication output with each of said devices from such designated spots in said subarrays.

* * * * *